(12) United States Patent
Yamagishi et al.

(10) Patent No.: US 9,664,893 B2
(45) Date of Patent: May 30, 2017

(54) PHOSPHOR WHEEL DEVICE, PHOSPHOR WHEEL DEVICE ACCOMMODATING HOUSING AND PROJECTION-TYPE IMAGE DISPLAY DEVICE

(71) Applicant: Panasonic Intellectual Property Management Co., Ltd., Osaka-shi, Osaka (JP)

(72) Inventors: Shigekazu Yamagishi, Osaka (JP); Manabu Chikayama, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/852,015

(22) Filed: Sep. 11, 2015

(65) Prior Publication Data
US 2016/0077326 A1 Mar. 17, 2016

(30) Foreign Application Priority Data

Sep. 17, 2014 (JP) .................................. 2014-188959
Aug. 4, 2015 (JP) .................................. 2015-153873

(51) Int. Cl.
*G02B 26/00* (2006.01)
*G03B 21/20* (2006.01)
*G03B 21/16* (2006.01)

(52) U.S. Cl.
CPC ........... *G02B 26/008* (2013.01); *G03B 21/16* (2013.01); *G03B 21/204* (2013.01)

(58) Field of Classification Search
CPC ...... G03B 21/204; G03B 21/16; G03B 21/14; G03B 21/20; H04N 9/3144; H04N 9/3141; H04N 9/3158; H04N 9/3114; H04N 9/3117

USPC .................... 353/84, 353, 52, 57, 58, 60, 61
See application file for complete search history.

(56) References Cited

U.S. PATENT DOCUMENTS

| 2003/0095349 | A1 | 5/2003 | Inamoto | |
|---|---|---|---|---|
| 2008/0049345 | A1* | 2/2008 | Niwa | G02B 26/008 359/889 |
| 2011/0199580 | A1* | 8/2011 | Hirata | G03B 21/20 353/31 |
| 2012/0201030 | A1* | 8/2012 | Yuan | G02B 26/008 362/293 |
| 2013/0169938 | A1* | 7/2013 | Huang | G03B 21/16 353/31 |

FOREIGN PATENT DOCUMENTS

| JP | 2003-156796 | 5/2003 |
|---|---|---|
| JP | 2006-064784 | 3/2006 |
| JP | 2006-133357 | 5/2006 |

* cited by examiner

*Primary Examiner* — William C Dowling
*Assistant Examiner* — Ryan Howard
(74) *Attorney, Agent, or Firm* — Hamre, Schumann, Mueller & Larson, P.C.

(57) ABSTRACT

A phosphor wheel device includes: a phosphor wheel; a motor; and a plurality of blades. The phosphor wheel has: a disc-shaped substrate; and a phosphor disposed on one surface of the substrate in a circumferential direction. The motor rotatably drives the phosphor wheel. The plurality of blades are fixed to the other surface of the substrate so as to be integrally rotated with the phosphor wheel, and extend in a radial direction of the phosphor wheel from an axis of rotation of the motor.

17 Claims, 19 Drawing Sheets

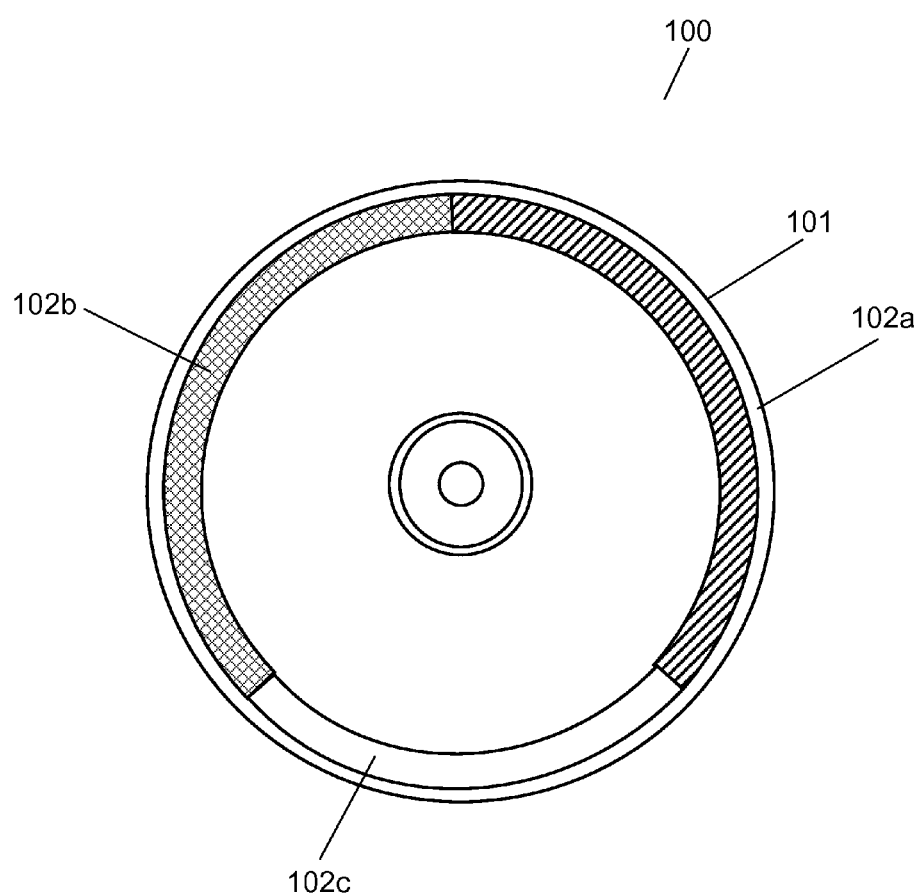

PHOSPHOR WHEEL DEVICE, PHOSPHOR WHEEL DEVICE ACCOMMODATING HOUSING AND PROJECTION-TYPE IMAGE DISPLAY DEVICE

BACKGROUND

1. Field of the Disclosure

The present disclosure relates to a phosphor wheel device used in a projection-type image display device, a phosphor wheel device accommodating housing for housing a phosphor wheel device therein, and a projection-type image display device provided with a phosphor wheel device.

2. Background Art

Unexamined Japanese Patent Publication No. 2003-156796 (patent literature 1) discloses an illumination device. In the illumination device, a rotary-type optical filter is used in a form where a cooling fan for cooling heat generated by a color filter is integrally formed with the optical filter. In the optical filter, the cooling fan is rotated together with a color filter, and the color filter is cooled by an air flow generated by the cooling fan.

SUMMARY

This disclosure provides a phosphor wheel device, a phosphor wheel device accommodating housing, and a projection-type image display device which can effectively radiate heat generated by a phosphor wheel.

A phosphor wheel device according to this disclosure includes: a phosphor wheel; a motor; and a plurality of blades. The phosphor wheel has: a disc-shaped substrate; and a phosphor disposed on one surface of the substrate in a circumferential direction. The motor rotatably drives the phosphor wheel. The plurality of blades are fixed to the other surface of the substrate so as to be integrally rotated with the phosphor wheel, and extend in a radial direction of the phosphor wheel from an axis of rotation of the motor.

A phosphor wheel device accommodating housing according to this disclosure has a heat exchange element and hermetically accommodates the above-mentioned phosphor wheel device therein.

A projection-type image display device according to this disclosure includes: the above-mentioned phosphor wheel device; the above-mentioned phosphor wheel device accommodating housing; an excitation light source generating excitation light which excites a phosphor; and an optical modulation element generating image light by modulating light emitted from the phosphor based on an image signal.

The phosphor wheel device according to this disclosure is effectively used in efficiently cooling heat generated by a phosphor.

BRIEF DESCRIPTION OF DRAWINGS

FIG. 19 is a plan view showing a surface of a phosphor wheel device which the projection-type image display device according to the seventh exemplary embodiment includes, a phosphor being formed on the surface.

DETAILED DESCRIPTION

Hereinafter, exemplary embodiments are explained with reference to drawings suitably. However, descriptions with more detail than necessary may be omitted. For example, the detailed description with respect to matters which are already well-known and the repeated description with respect to the substantially same configurations may be omitted. This is to prevent the following descriptions from being unnecessarily redundant thus facilitating the understanding of this present disclosure by those who are skilled in the art.

Further, the attached drawings and the following description are provided to enable those who are skilled in the art to sufficiently understand the present disclosure, and the gist of the present disclosure defined in the claims is not intended to be restricted by the attached drawings and the following description.

In the description made hereinafter, the same signs, the same symbols or the same numerals indicate, unless otherwise specified, identical components. Further, unless otherwise specified, components which are not indispensable in the present disclosure are not illustrated.

Hereinafter, a phosphor wheel device is described in first to third exemplary embodiments. A housing for accommodating a phosphor wheel device (hereinafter referred to as "phosphor wheel device accommodating housing" or simply referred to as "accommodating housing") is described in fourth and fifth exemplary embodiments. A projection-type image display device is described in sixth and seventh exemplary embodiments.

In the exemplary embodiments described hereinafter, an example where excitation light is blue light B is described. However, excitation light may be light having a different wavelength.

(First Exemplary Embodiment)

Phosphor wheel device 100 according to the first exemplary embodiment is described with reference to FIG. 1A to FIG. 3C.

[1-1: Configuration]

Figure 1A:
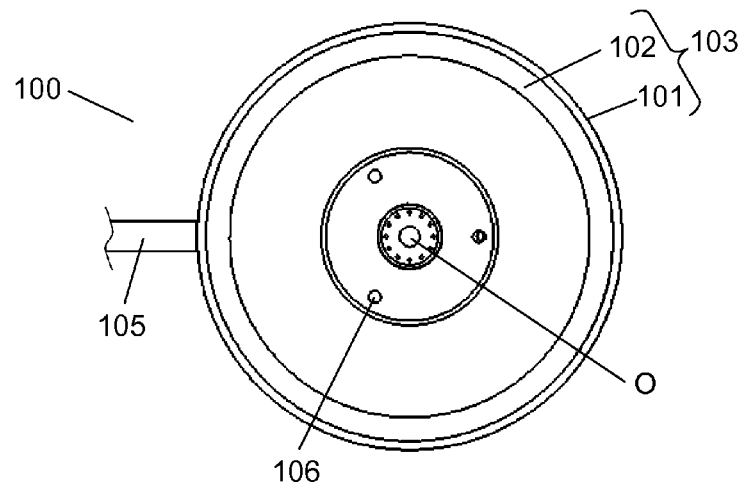
FIG. 1A is a plan view showing a front surface of a phosphor wheel device according to a first exemplary embodiment.
Figure 1B:
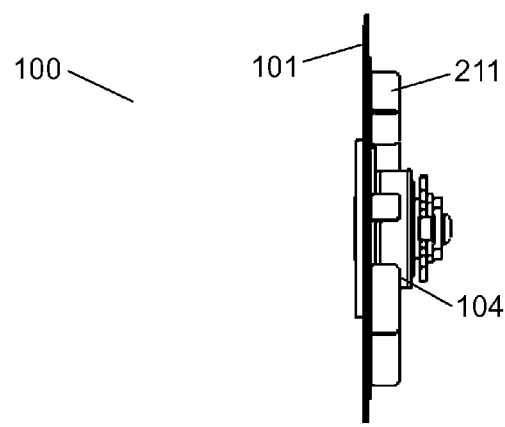
FIG. 1B is a side view of the phosphor wheel device according to the first exemplary embodiment.
Figure 1C:
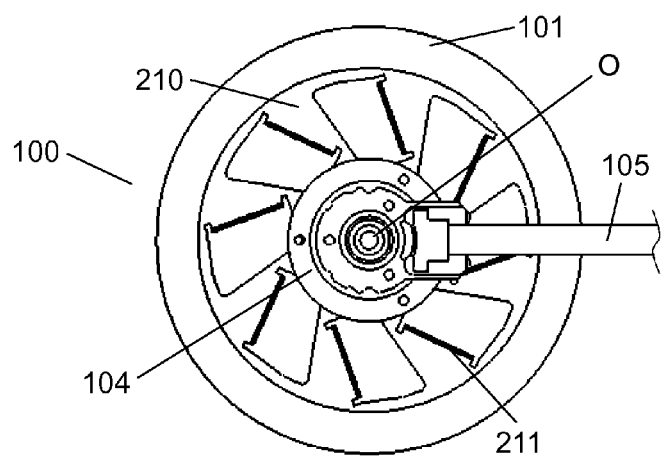
FIG. 1C is a plan view showing a back surface of the phosphor wheel device according to the first exemplary embodiment.

FIG. 1A is a plan view showing the front surface of phosphor wheel device 100 according to the first exemplary embodiment. FIG. 1B is a side view of phosphor wheel device 100 according to the first exemplary embodiment. FIG. 1C is a plan view showing a back surface of phosphor wheel device 100 according to the first exemplary embodiment.

Figure 2A:
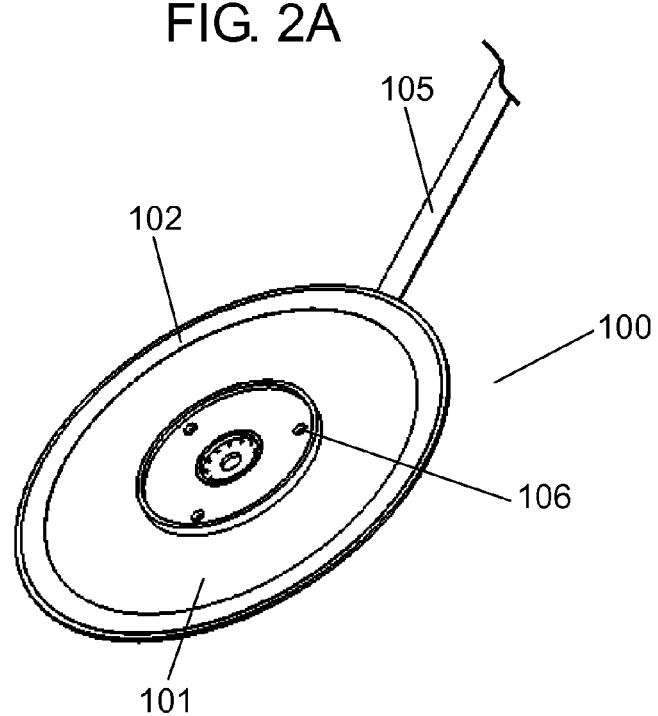
FIG. 2A is a perspective view showing the front surface of the phosphor wheel device according to the first exemplary embodiment.
Figure 2B:
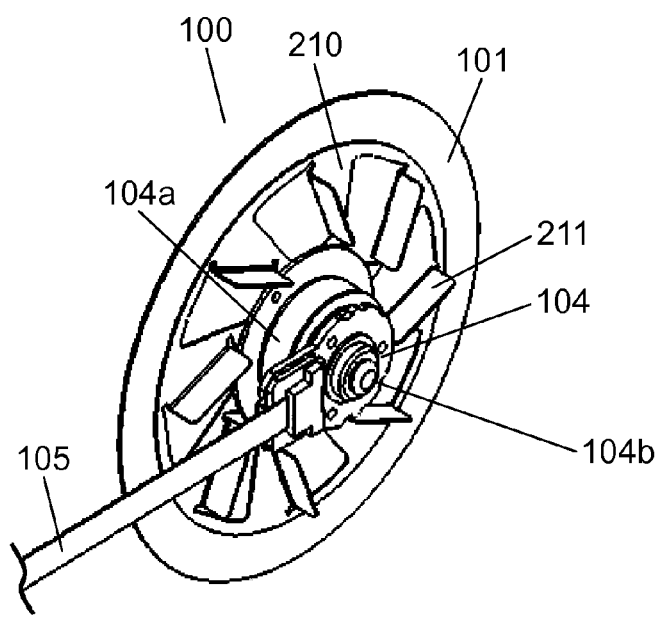
FIG. 2B is a perspective view showing the back surface of the phosphor wheel device according to the first exemplary embodiment.

FIG. 2A is a perspective view showing a front surface of phosphor wheel device 100 according to the first exemplary embodiment. FIG. 2B is a perspective view showing a back surface of phosphor wheel device 100 of the first exemplary embodiment.

Figure 3A:
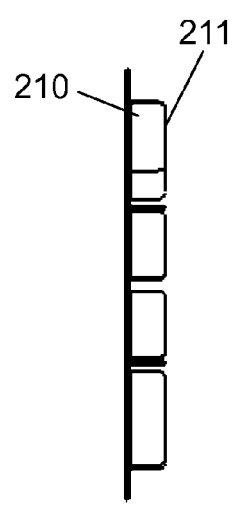
FIG. 3A is a side view of a fan member which the phosphor wheel device according to the first exemplary embodiment includes.
Figure 3B:
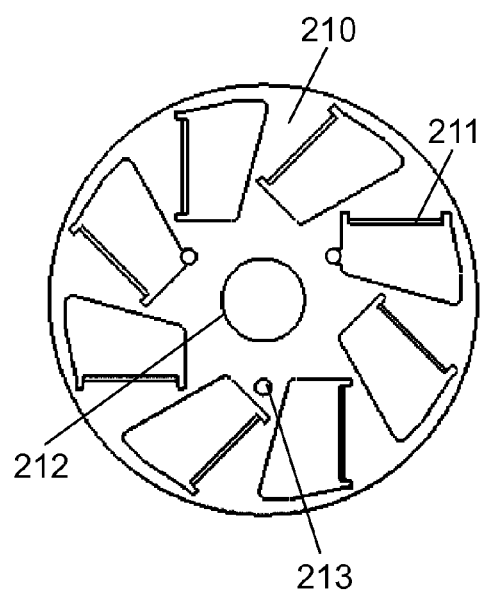
FIG. 3B is a plan view of the fan member which the phosphor wheel device according to the first exemplary embodiment includes.
Figure 3C:
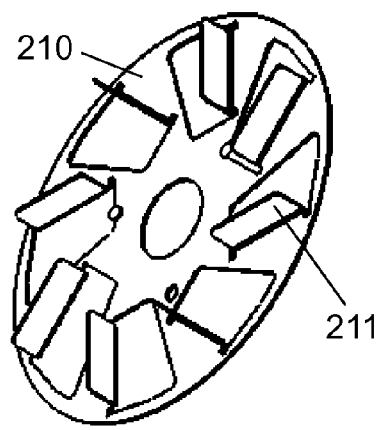
FIG. 3C is a perspective view of the fan member which the phosphor wheel device according to the first exemplary embodiment includes.

FIG. 3A is a side view of fan member 210 which phosphor wheel device 100 according to the first exemplary embodiment includes. FIG. 3B is a plan view of fan member 210 which phosphor wheel device 100 according to the first exemplary embodiment includes. FIG. 3C is a perspective view of fan member 210 which phosphor wheel device 100 of the first exemplary embodiment includes.

Phosphor wheel device 100 includes phosphor wheel 103. Phosphor wheel 103 includes: disc-shaped substrate 101 made of a heat conductive material; and phosphor 102 disposed in a vicinity of an outer periphery of substrate 101 along a circumferential direction with a substantially fixed width.

Phosphor 102 is disposed on the circular circumference of one surface of substrate 101 away from center O of substrate 101 by a predetermined distance (approximately 3 cm, for example) in a circular annular shape with a predetermined width (approximately 5 mm, for example,). In this exemplary embodiment, for the sake of convenience, assume one surface of substrate 101 as a front surface. Phosphor 102 is formed of a phosphor material which emits yellow light Ye, for example. Phosphor 102 is, for example, formed by mixing phosphor powder and a thermosetting resin with each other, by applying the mixed material to the front surface of substrate 101 by screen printing in a circular annular shape and, thereafter, by curing the mixed material with heat in a heating furnace. The above-mentioned numerical values merely indicate one example, and this disclosure is not limited to these numerical values at all. Further, the above-mentioned manufacturing method merely indicates one example.

As a heat conductive material for forming substrate 101, for example, an aluminum material or a sapphire glass material can be used. However, this disclosure is not limited to such a configuration at all. It is sufficient that a heat conductive material for forming substrate 101 be a material having favorable heat conductivity and being easily formed into the substrate by working.

Motor 104 which rotatably drives substrate 101 is mounted on phosphor wheel 103. Although motor 104 is a spindle motor, for example, a kind of motor 104 is not limited in this disclosure.

As shown in FIG. 2B, rotor 104a of motor 104 is mounted on the other surface (a surface opposite to the surface on which phosphor 102 is disposed) of substrate 101, and stator 104b of motor 104 is mounted on a support member (not shown in the drawing) for supporting phosphor wheel device 100. In this exemplary embodiment, for the sake of convenience, assume the other surface of substrate 101 as a back surface. In motor 104, with the supply of a drive voltage to stator 104b through flexible printed circuit board 105, rotor 104a is rotatably driven.

As shown in FIG. 1C and FIG. 2B, fan member 210 in which a plurality of blades 211 are formed by bending a stainless steel plate is mounted on the back surface of substrate 101.

As shown in FIG. 1A to FIG. 3C, blades 211 are formed by cutting and raising the stainless steel plate such that blades 211 become substantially perpendicular to substrate 101 when fan member 210 is mounted on substrate 101. Further, blades 211 are formed substantially at equal intervals such that, when fan member 210 is mounted on substrate 101, blades 211 extend linearly from center O of substrate 101 (the axis of rotation of motor 104) with predetermined inclination (for example, 30 degrees) with respect to the radial direction of phosphor wheel 103, and are positioned more inside (center O side) than the position of phosphor 102. Fan member 210 is formed such that, when fan member 210 is mounted on substrate 101, a distance from blades 211 to phosphor 102 becomes equal to or larger than a height (for example, 5 mm) of blades 211. The above-mentioned numerical values merely indicate one example, and this disclosure is not limited to these numerical values at all.

Screw holes 213 which are aligned with screw holes 106 formed in substrate 101 are formed in fan member 210, and opening 212 aligned with rotor 104a of motor 104 is formed in a center portion of fan member 210.

Rotor 104a of motor 104 is fitted in opening 212 of fan member 210. By threadedly engaging screws (not showing in the drawing) inserted into screw holes 106 into screw holes 213 formed in fan member 210 from a front surface side of substrate 101, fan member 210 is fixed to substrate 101. Using these screws, rotor 104a of motor 104 is also fixed to substrate 101 by screw fastening. That is, fan member 210 and rotor 104a of motor 104 are fixed together to substrate 101 by fastening using the screws which are threadedly engaged with screw holes 106 and screw holes 213.

In this manner, fan member 210 is mounted on substrate 101 such that fan member 210 is integrally rotated with phosphor wheel 103. Accordingly, when phosphor wheel 103 is rotatably driven by motor 104, the plurality of blades 211 are also rotated in a circumferential direction of phosphor wheel 103 about the axis of rotation of motor 104. Due to such rotation, an air flow is generated by the plurality of blades 211.

In a projection-type image display device, when brightness of excitation light outputted from an excitation light source is increased so as to increase brightness of a display image, a phosphor to which excitation light is applied becomes a higher temperature and hence, the deterioration of the phosphor is liable to progress. Further, when the phosphor becomes a high temperature, light emission efficiency is lowered and hence, brightness of emitted light is lowered. The deterioration of motor is also liable to progress under a high temperature. Accordingly, it is desirable that a phosphor wheel on which a motor is integrally mounted be used with the phosphor wheel being appropriately cooled.

In phosphor wheel 103 according to this exemplary embodiment, as described above, when phosphor wheel 103 is rotatably driven by motor 104, an air flow is generated by the plurality of blades 211. Accordingly, with an air flow generated by the rotation of the plurality of blades 211 together with the substrate 101, it is possible to effectively cool phosphor 102 whose temperature is elevated by being heated by excitation light and substrate 101 heated by heat of phosphor 102.

In phosphor wheel device 100 of this exemplary embodiment, fan member 210 is formed of a stainless steel plate and hence, it is possible to form fan member 210 rigidly at a low cost using a thin material.

A material for forming fan member 210 is not limited to stainless steel. Fan member 210 may be formed of a steel plate where rust prevention treatment is applied to an iron plate or the like.

[1-2. Structure]

Next, the structure of phosphor wheel device 100 is described with reference to FIG. 4 to FIG. 6.

Figure 4:
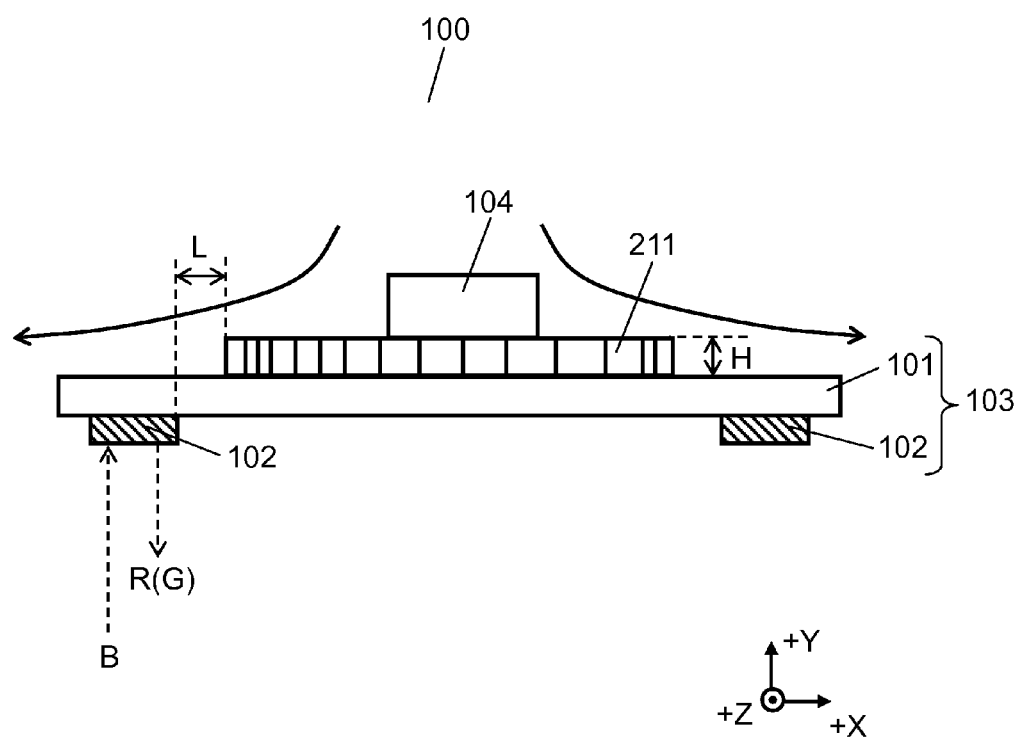
FIG. 4 is a view schematically showing one example of the first structure of the phosphor wheel device according to the first exemplary embodiment.

FIG. 4 is a view schematically showing one example of the first structure of phosphor wheel device 100 according to the first exemplary embodiment.

Figure 5:
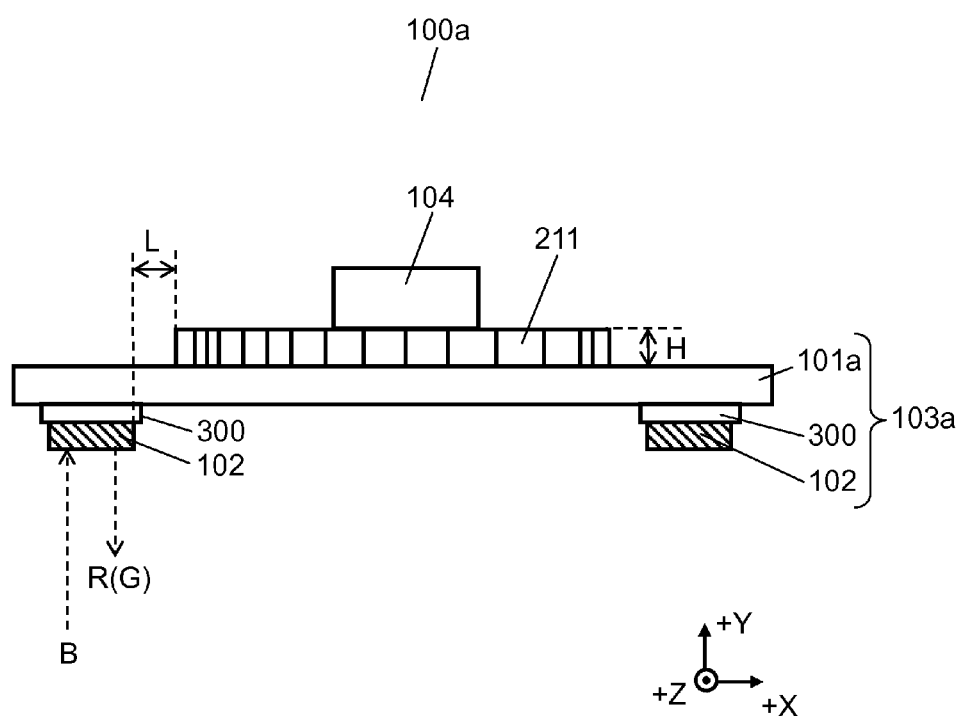
FIG. 5 is a view schematically showing one example of the second structure of the phosphor wheel device according to the first exemplary embodiment.

FIG. 5 is a view schematically showing one example of the second structure of phosphor wheel device 100 according to the first exemplary embodiment.

Figure 6:
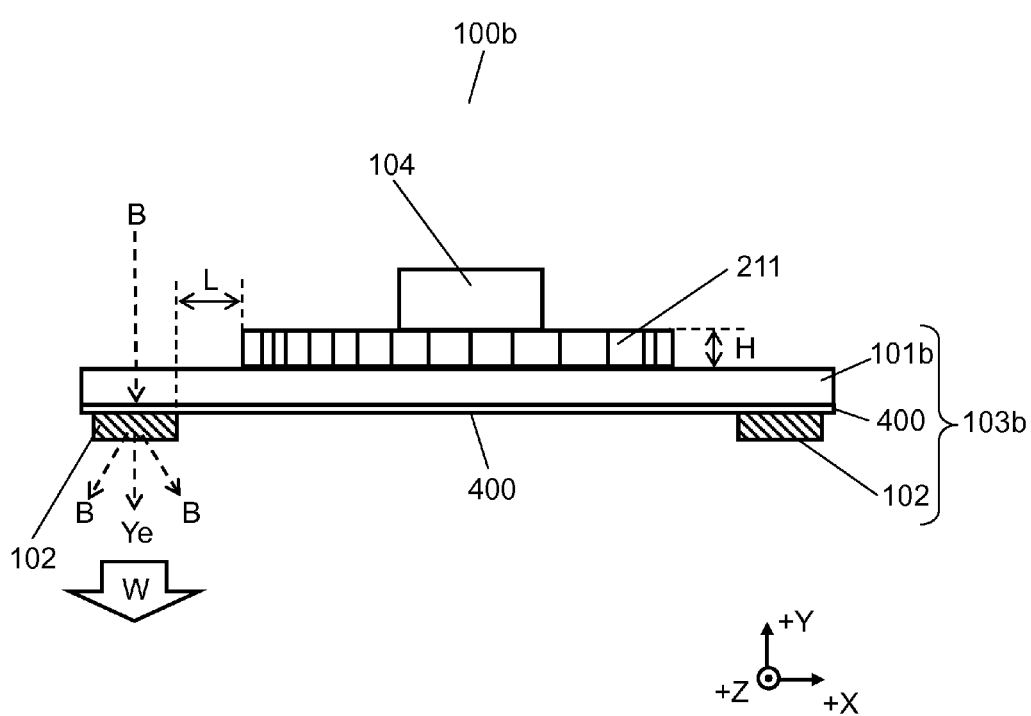
FIG. 6 is a view schematically showing one example of the third structure of the phosphor wheel device according to the first exemplary embodiment.

FIG. 6 is a view schematically showing one example of the third structure of phosphor wheel device 100 according to the first exemplary embodiment.

Hereinafter, this exemplary embodiment is described using an XYZ orthogonal coordinate system for the sake of the convenience. In FIG. 4 to FIG. 6, the direction perpendicular to the back surface of substrate 101 is set as "+Y direction", the radial direction of substrate 101 is set as "+X direction", and the radial direction of substrate 101 orthogonal to the X axis is set as "+Z direction".

Hereinafter, the first structure (phosphor wheel device 100), the second structure (phosphor wheel device 100a) and the third structure (phosphor wheel device 100b) are described in this order.

[1-2-1. First Structure]

A substrate of phosphor wheel device may be formed of a material which easily reflects light (reflective material).

In the first structure shown in FIG. 4, substrate 101 of phosphor wheel device 100 is formed of a reflective material such as aluminum, for example.

Further, a region of a front surface of substrate 101 on which at least phosphor 102 is disposed is formed such that working (for example, mirror finish working) is applied to a surface so as to make the surface reflect light emitted from phosphor 102. Mirror finish working may be applied to the whole front surface of substrate 101, for example.

In the first structure, as shown in FIG. 4, blue excitation light B emitted from an excitation light source (not shown in the drawing) is made to advance in the +Y direction (from below to above in the drawing) and is applied to phosphor 102. When phosphor 102 is a red phosphor, phosphor 102 to which excitation light B is applied emits red light R. When phosphor 102 is a green phosphor, phosphor 102 to which excitation light B is applied emits green light G. A portion of light (R, G) emitted from phosphor 102 is emitted in the −Y direction (from above to below in the drawing) from phosphor 102. On the other hand, another portion of light (R, G) emitted from phosphor 102 is emitted in the +Y direction from phosphor 102, is reflected on the surface of substrate 101, and is emitted in the −Y direction from the front surface of substrate 101.

In this manner, in the first structure, it is possible to acquire red light R and green light G emitted from phosphor wheel device 100 in the −Y direction.

In phosphor wheel device 100, distance L from blades 211 to phosphor 102 is set to be equal to or larger than height H of blades 211. Such distance L is set due to the following reason. An air flow generated by rotating blades 211 is moved while gradually increasing a speed in the direction indicated by an arrow of a solid line in the drawing. In phosphor wheel device 100, to cool phosphor 102, it is required to generate an air flow having a sufficient speed in a vicinity of the position of phosphor 102. However, it is confirmed by an experiment that when blades 211 are excessively long, an air flow cannot acquire a sufficient speed in the vicinity of the position of phosphor 102 so that a sufficient cooling effect cannot be acquired. On the other hand, it is also confirmed by an experiment that when distance L from blades 211 to phosphor 102 is set to be equal to or larger than height H of blades 211, an air flow can increase a speed within distance L, and an air flow sufficient for cooling phosphor 102 is generated in the vicinity of the position of phosphor 102.

Due to such a reason, in phosphor wheel device 100, distance L from blades 211 to phosphor 102 is set to be equal to or larger than height H of blades 211, thus realizing a sufficient cooling effect. In these experiments, it is confirmed that a cooling effect of 50° C. to 80° C. can be acquired by providing blades 211 to phosphor wheel device 100 under the above-mentioned condition. However, the cooling effect differs depending on various conditions and hence, this disclosure is not limited to these values.

[1-2-2. Second Structure]

The substrate of the phosphor wheel device may be formed of a material which minimally reflects light (non-reflective material).

In the second structure shown in FIG. 5, substrate 101*a* of phosphor wheel device 100*a* is formed of a non-reflective material.

However, in this case, in phosphor wheel device 100*a*, on a region of substrate 101*a* where phosphor 102 is disposed, reflection film 300 having a surface thereof worked (for example, mirror finish working) such that light is reflected is formed by coating between substrate 101*a* and phosphor 102. That is, in the second structure, reflection film 300 is formed on substrate 101*a*, and phosphor 102 is disposed on reflection film 300. Accordingly, in the second structure, phosphor wheel device 100*a* includes phosphor wheel 103*a* having substrate 101*a*, reflection film 300 and phosphor 102.

In the second structure, in the same manner as the first structure, blue excitation light B emitted from an excitation light source (not shown in the drawing) is made to advance in the +Y direction and is applied to phosphor 102. Phosphor 102 to which excitation light B is applied emits a portion of emitted light (R, G) in the −Y direction from phosphor 102, and emits another portion of emitted light (R, G) in the +Y direction from phosphor 102. Light (R, G) emitted from phosphor 102 which advances in the +Y direction is reflected on a front surface of reflection film 300 which is formed on substrate 101*a*, and is emitted in the −Y direction from a front surface of substrate 101*a* in the same manner as the first structure shown in FIG. 4.

In this manner, in the second structure, in the same manner as the first structure, it is possible to acquirer red light R and green light G emitted from phosphor wheel device 100*a* in the −Y direction.

In the second structure, reflection film 300 is formed on substrate 101*a* such that reflection film 300 corresponds to at least the region where phosphor 102 is disposed. However, reflection film 300 may be formed on the whole surface of substrate 101*a* where phosphor 102 is disposed.

Also in phosphor wheel device 100*a*, distance L from blades 211 to phosphor 102 is set equal to or larger than height H of blades 211, thus realizing a sufficient cooling effect.

[1-2-3. Third Structure]

A substrate of a phosphor wheel device may be formed of a material which allows light to pass therethrough (light transmitting material).

In the third structure shown in FIG. 6, substrate 101*b* of phosphor wheel device 100*b* is formed of a light transmission material such as sapphire glass, for example.

In this case, in phosphor wheel device 100*b*, on a surface of substrate 101*b* where phosphor 102 is disposed, dichroic film 400 having a characteristic of allowing excitation light (for example, blue light B) to pass therethrough and a characteristic of reflecting light emitted from phosphor 102 (for example, mixed light of green light G and red light R, hereinafter, referred to as yellow light Ye) is formed by coating. That is, in the third structure, dichroic film 400 is formed on substrate 101*b*, and phosphor 102 is disposed on dichroic film 400. Accordingly, in the third structure, phosphor wheel device 100*b* includes phosphor wheel 103*b* having; substrate 101*b*; dichroic film 400; and phosphor 102. Hereinafter, a case is exemplified where excitation light is blue light B, and phosphor 102 is formed of a phosphor material which emits yellow light Ye.

In the third structure, unlike the first and second structures, as shown in FIG. 6, blue excitation light (blue light B) emitted from an excitation light source (not shown in the drawing) is made to advance in the −Y direction (from above to below in the drawing), and is applied toward phosphor 102 from a back surface side of substrate 101*b*. Excitation light B passes through substrate 101*b* and dichroic film 400, and is applied to phosphor 102 so as to excite phosphor 102.

Phosphor 102 to which excitation light B is applied emits a portion of emitted light (yellow light Ye) in the −Y direction from phosphor 102, and emits another portion of the emitted light (yellow light Ye) in the +Y direction from phosphor 102. Light (yellow light Ye) emitted from phosphor 102 which advances in the +Y direction is reflected on dichroic film 400 formed on substrate 101*b*, and is emitted in the −Y direction from a front surface of substrate 101*b*.

A portion of excitation light (blue light B) passes through phosphor 102 without being used for excitation of phosphor 102, and is emitted in the −Y direction from phosphor 102. As a result, light emitted from phosphor 102 becomes mixed light of yellow light Ye and blue light B, that is, white light W.

In this manner, in the third structure, it is possible to acquirer white light W as light emitted from phosphor wheel device 100*b* in the −Y direction.

Also in phosphor wheel device 100*b*, distance L from blades 211 to phosphor 102 is set equal to or larger than height H of blades 211, thus realizing a sufficient cooling effect.

[1-3. Effects and Others]

As described above, in this exemplary embodiment, the phosphor wheel device includes: the phosphor wheel; the motor; and the plurality of blades. The phosphor wheel has: the disc-shaped substrate; and the phosphor disposed on one surface of the substrate in a circumferential direction. The motor rotatably drives the phosphor wheel. The plurality of blades are fixed to the other surface of the substrate so as to be integrally rotated with the phosphor wheel, and extend in a radial direction of the phosphor wheel from an axis of rotation of the motor.

In the phosphor wheel device, it is desirable that the blades are disposed on the other surface of the substrate such that the blades are positioned more inside than a position of the phosphor. It is also desirable that a distance from the blades to the phosphor is set equal to or larger than a height of the blades.

In the phosphor wheel device, the fan member having the plurality of blades may be fixedly mounted on the other surface of the substrate.

In the phosphor wheel device, the fan member may be formed by bending a metal plate.

In the phosphor wheel device, at least a region, where the phosphor is disposed, of the one surface of the substrate having undergone a surface treatment such that the region reflects light emitted from the phosphor.

In the phosphor wheel device, the substrate may be formed of a heat conductive material.

According to this exemplary embodiment, it is possible to effectively cool the phosphor, the substrate and the like, whose temperatures are elevated by being heated by the excitation light, by an air flow generated due to the rotation of the plurality of blades together with the substrate.

Each of phosphor wheel devices 100, 100a, 100b is one example of the phosphor wheel device. Each of phosphor wheels 103, 103a, 103b is one example of the phosphor wheel. Motor 104 is one example of the motor. Blades 211 are one example of blades. Each of substrates 101, 101a, 101b is one example of the substrate. Phosphor 102 is one example of the phosphor. Fan member 210 is one example of the fan member. A stainless steel plate is one example of a metal plate used for forming the fan member. Each of aluminum and sapphire glass is one example of heat conductive material for forming the substrate. Aluminum is one example of a material having a surface thereof worked so as to reflect light emitted from the phosphor. Reflection film 300 is one example of a surface to which working is applied such that light emitted from the phosphor is reflected. Blue light B is one example of excitation light.

Second Exemplary Embodiment

Phosphor wheel device 120 according to the second exemplary embodiment is described with reference to FIG. 7A to FIG. 10.

[2-1. Configuration]

Figure 7A:
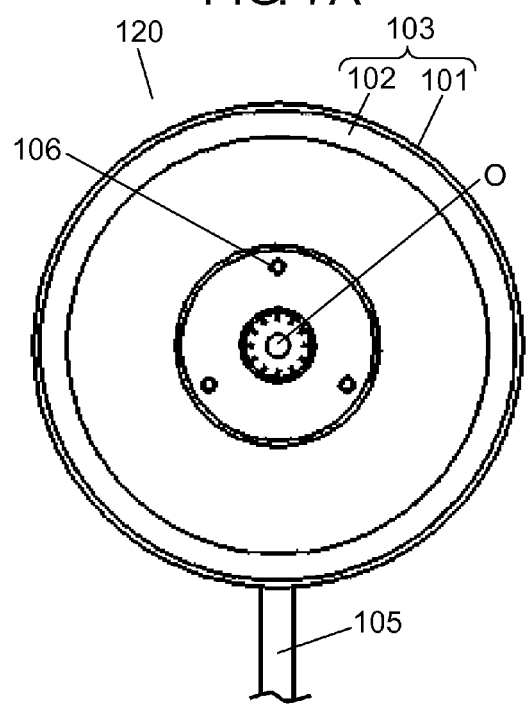
FIG. 7A is a plan view showing a front surface of a phosphor wheel device according to a second exemplary embodiment.
Figure 7B:
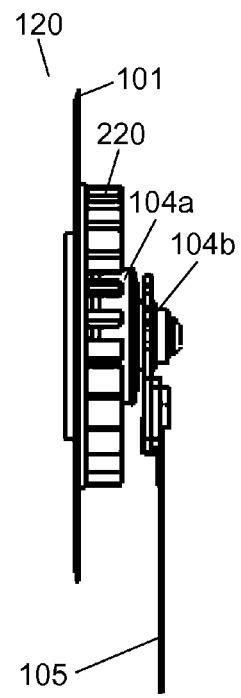
FIG. 7B is a side view of the phosphor wheel device according to the second exemplary embodiment.
Figure 7C:
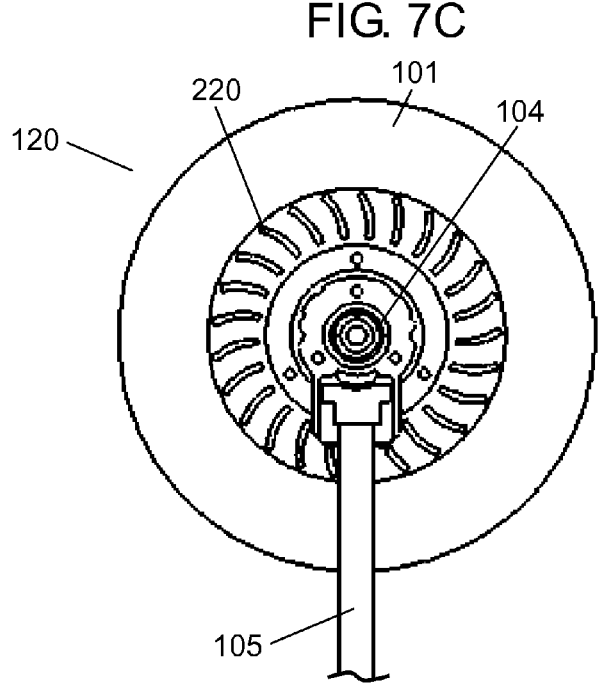
FIG. 7C is a plan view showing a back surface of the phosphor wheel device according to the second exemplary embodiment.

FIG. 7A is a plan view showing a front surface of phosphor wheel device 120 according to the second exemplary embodiment. FIG. 7B is a side view of phosphor wheel device 120 according to the second exemplary embodiment. FIG. 7C is a plan view showing a back surface of phosphor wheel device 120 according to the second exemplary embodiment.

Figure 8A:
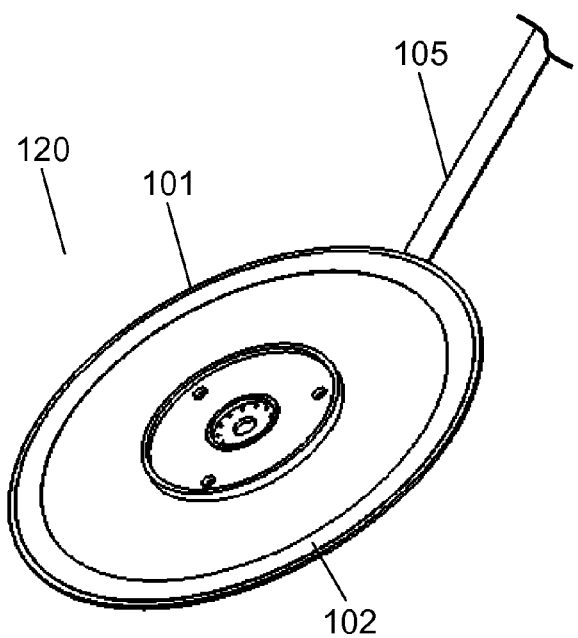
FIG. 8A is a perspective view showing the front surface of the phosphor wheel device according to the second exemplary embodiment.
Figure 8B:
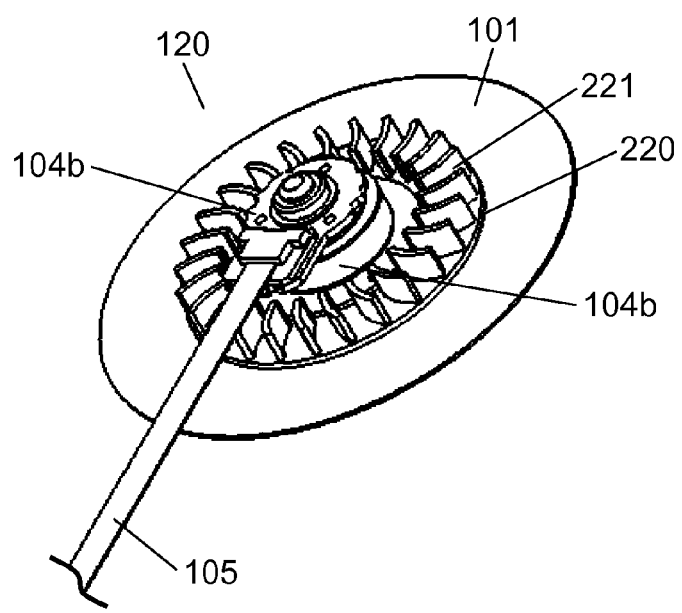
FIG. 8B is a perspective view showing the back surface of the phosphor wheel device according to the second exemplary embodiment.

FIG. 8A is a perspective view showing a front surface of phosphor wheel device 120 according to the second exemplary embodiment. FIG. 8B is a perspective view showing the back surface of phosphor wheel device 120 according to the second exemplary embodiment.

Figure 9A:
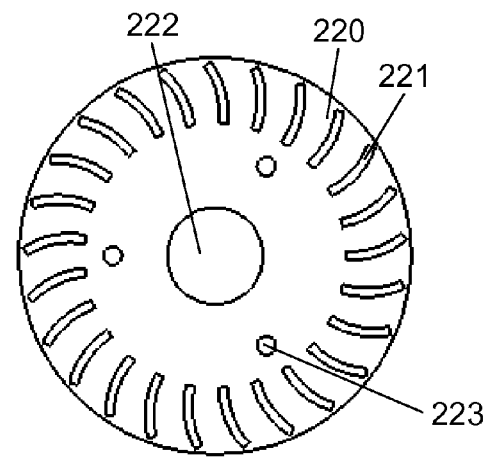
FIG. 9A is a plan view showing a back surface of a fan member which the phosphor wheel device according to the second exemplary embodiment includes.
Figure 9B:
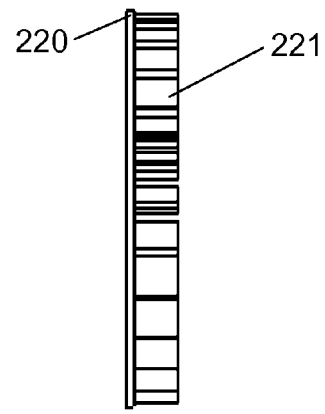
FIG. 9B is a side view of the fan member which the phosphor wheel device according to the second exemplary embodiment includes.
Figure 9C:
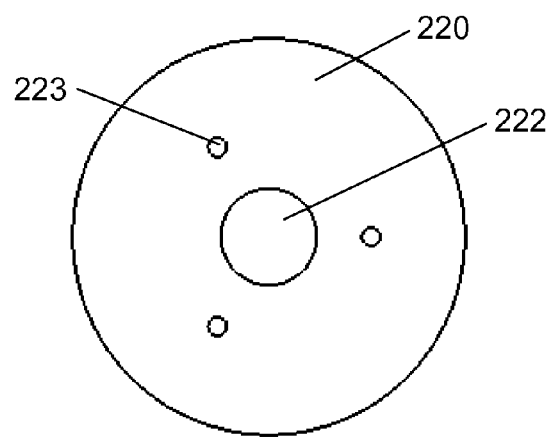
FIG. 9C is a plan view showing a front surface of the fan member which the phosphor wheel device according to the second exemplary embodiment includes.

FIG. 9A is a plan view showing a back surface of fan member 220 which phosphor wheel device 120 according to the second exemplary embodiment includes. FIG. 9B is a side view of fan member 220 which phosphor wheel device 120 according to the second exemplary embodiment includes. FIG. 9C is a plan view showing a front surface of fan member 220 which phosphor wheel device 120 according to the second exemplary embodiment includes.

Figure 10:
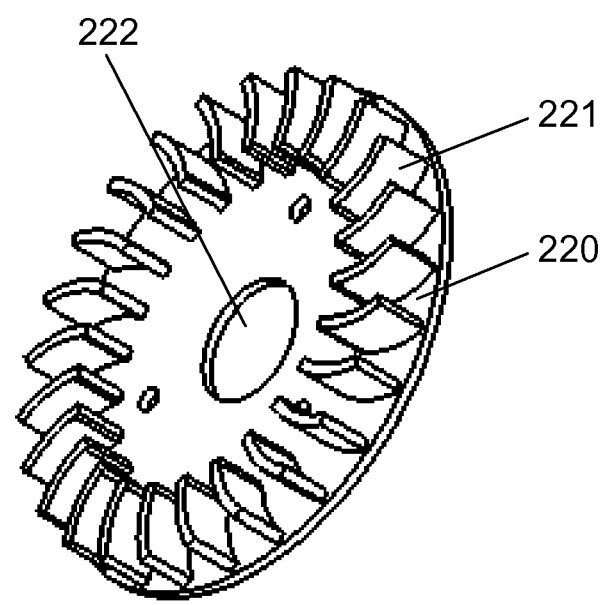
FIG. 10 is a perspective view of the fan member which the phosphor wheel device according to the second exemplary embodiment includes.

FIG. 10 is a perspective view of fan member 220 which phosphor wheel device 120 according to the second exemplary embodiment includes.

In the second exemplary embodiment, components equal to the components of the first exemplary embodiment are given the same symbols and the repeated description of these components is omitted.

In the first exemplary embodiment, the description is made with respect to fan member 210 in which the plurality of blades 211 are formed by bending a stainless steel plate. Phosphor wheel device 120 according to the second exemplary embodiment differs from phosphor wheel device 100 according to the first exemplary embodiment with respect to a point that fan member 220 having a plurality of blades 221 is formed by cutting aluminum. Since phosphor wheel device 120 according to the second exemplary embodiment is substantially equal to phosphor wheel device 100, phosphor wheel device 100a or phosphor wheel device 100b according to the first exemplary embodiment except for the above-mentioned point, the repeated description of other components is omitted.

As shown in FIG. 9A to FIG. 10, the plurality of blades 221 are integrally formed with fan member 220.

As shown in FIG. 7A to FIG. 10, blades 221 are formed such that blades 221 become substantially perpendicular to substrate 101 when fan member 220 is mounted on substrate 101. Further, blades 221 are formed substantially at equal intervals such that, when fan member 220 is mounted on substrate 101, blades 221 extend in a curved shape from center O of the substrate (the axis of rotation of motor 104) with predetermined inclination with respect to the radial direction of phosphor wheel 103, and blades 221 are positioned more inside (center O side) than the position of phosphor 102. Fan member 220 is formed such that, when fan member 220 is mounted on substrate 101, a distance from blades 221 to phosphor 102 is set equal to or larger than a height of blades 221.

Blades 221 may not extend in a curved shape. Blades 221 may have substantially the same shape as blades 211 described in the first exemplary embodiment.

Screw holes 223 which are aligned with screw holes 106 formed in substrate 101 are formed in fan member 220, and opening 222 aligned with rotor 104a of motor 104 is formed in a center portion of fan member 220.

Rotor 104a of motor 104 is fitted in opening 222 of fan member 220. As shown in FIG. 7A to FIG. 8B, by threadedly engaging screw holes 106 formed in substrate 101 and screw holes 223 formed in fan member 220 by screws (not showing in the drawing), fan member 220 is fixed to substrate 101 together with rotor 104a of motor 104.

In this manner, in the second exemplary embodiment, fan member 220 is mounted on substrate 101 such that fan member 220 is integrally rotated with phosphor wheel 103 in the same manner as the first exemplary embodiment. Accordingly, when phosphor wheel 103 is rotatably driven by motor 104, the plurality of blades 221 are also rotated in a circumferential direction of phosphor wheel 103 about the axis of rotation of motor 104. Due to such rotation, an air flow is generated by the plurality of blades 221.

Accordingly, also in this exemplary embodiment, it is possible to effectively cool phosphor 102, substrate 101 and the like, whose temperatures are elevated by being heated by excitation light, by an air flow generated by rotating the plurality of blades 221 together with the substrate 101.

The restriction in terms of working is imposed at the time of applying press working to a metal plate. Fan member 220 of phosphor wheel device 120 is formed by cutting aluminum and hence, in this exemplary embodiment, fan member 220 can be formed without being constrained by such restriction. For example, the wheel (portion brought into contact with the substrate) and the fan (a plurality of blades) can be formed separately from each other and hence, the wheel and the fan can be formed of aluminums having different properties. For example, a case is also considered where a highly pure aluminum alloy which exhibits excellent thermal conductivity is used as a material for forming the wheel, and an aluminum alloy which exhibits excellent workability and high rigidity is used for forming the fan portion.

In the second exemplary embodiment, the configuration example is described where fan member 220 is mounted on phosphor wheel 103 having the first structure described in first exemplary embodiment and shown in FIG. 4. However, fan member 220 may be mounted on phosphor wheel 103a having the second structure shown in FIG. 5 or phosphor wheel 103b having the third structure shown in FIG. 6.

[2.2 Effects and Others]

As described above, in this exemplary embodiment, the phosphor wheel device includes: the phosphor wheel; the motor; and the plurality of blades. The phosphor wheel has:

the disc-shaped substrate; and the phosphor disposed on one surface of the substrate in a circumferential direction. The motor rotatably drives the phosphor wheel. The plurality of blades are fixed to the other surface of the substrate so as to be integrally rotated with the phosphor wheel, and extend in a radial direction of the phosphor wheel from the axis of rotation of the motor.

In the phosphor wheel device, it is desirable that the blades are disposed on the other surface of the substrate such that the blades are positioned more inside than a position of the phosphor. It is also desirable that a distance from the blades to the phosphor is set equal to or larger than a height of the blades.

Accordingly, also according to this exemplary embodiment, it is possible to effectively cool the phosphor, the substrate and the like whose temperatures are elevated by being heated by the excitation light by an air flow generated due to the rotation of the plurality of blades together with the substrate.

Phosphor wheel device 120 is one example of the phosphor wheel device. Each of blades 221 formed integrally with fan member 220 by cutting aluminum is one example of blades.

(Third Exemplary Embodiment)

Hereinafter, phosphor wheel device 130 of the third exemplary embodiment is described with reference to FIG. 11A and FIG. 11B.

[3-1. Configuration]

Figure 11A:
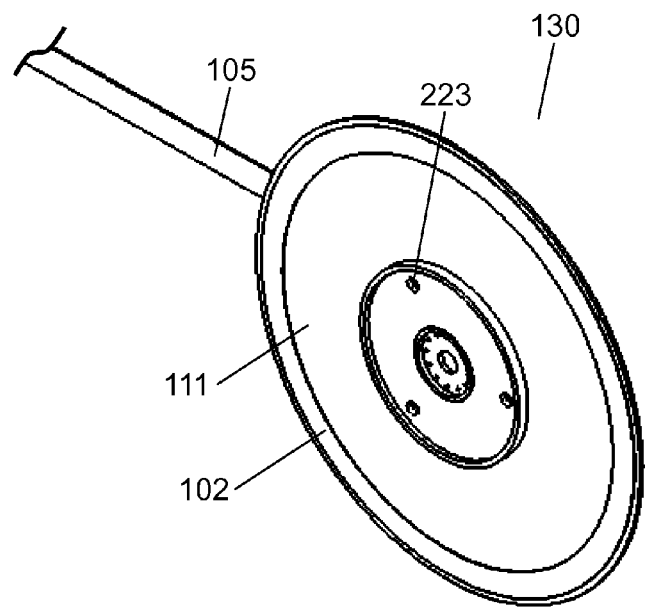
FIG. 11A is a perspective view showing a front surface of a phosphor wheel device according to a third exemplary embodiment.
Figure 11B:
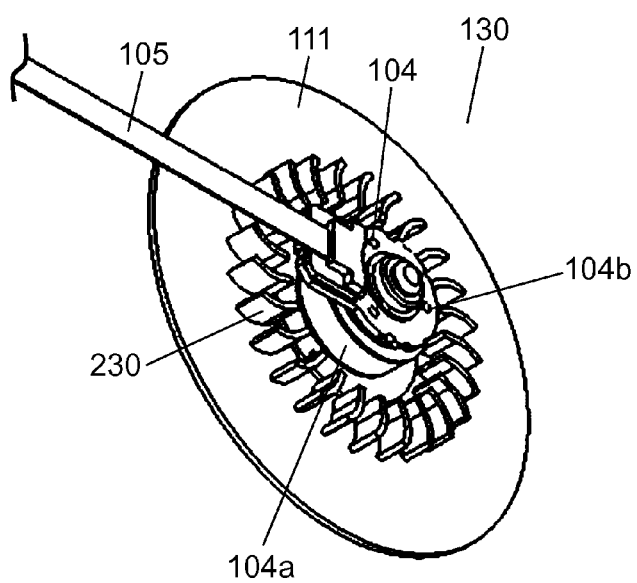
FIG. 11B is a perspective view showing a back surface of the phosphor wheel device according to the third exemplary embodiment.

FIG. 11A is a perspective view showing a front surface of phosphor wheel device 130 according to the third exemplary embodiment, and FIG. 11B is a perspective view showing a back surface of phosphor wheel device 130 according to the third exemplary embodiment.

In the third exemplary embodiment, components equal to the components of the first exemplary embodiment or the second exemplary embodiment are given the same symbols and the repeated description of these components is omitted.

In the first exemplary embodiment, the description is made with respect to the example where phosphor wheel device 100 is formed by mounting fan member 210 having the plurality of blades 211 on substrate 101. In the second exemplary embodiment, the description is made with respect to the example where phosphor wheel device 120 is formed by mounting fan member 220 having the plurality of blades 221 on substrate 101. The phosphor wheel device 130 described in the third exemplary embodiment differs from the phosphor wheel devices 100, 120 described in the first and second exemplary embodiments with respect to a point that substrate 111 in that a plurality of blades 230 are formed integrally with substrate 111. Since phosphor wheel device 130 according to the third exemplary embodiment is substantially equal to phosphor wheel device 100, phosphor wheel device 100a or phosphor wheel device 100b described in the first exemplary embodiment except for the above-mentioned point, the repeated description of other components is omitted.

Phosphor wheel device 130 includes disc-shaped substrate 111 formed of a heat conductive material. A plurality of blades 230 are formed on a back surface (a surface on which motor 104 is mounted) of substrate 111 in such a manner that blades 230 are integrally formed with substrate 111. Screw holes 223 for fastening rotor 104a of motor 104 to substrate 111 are formed in substrate 111. Substrate 111 is formed together with the plurality of blades 230 by die casting using aluminum as a material, for example. Phosphor 102 is formed on a front surface (a surface on which motor 104 is not mounted) of substrate 111 in the same manner as the first exemplary embodiment. Then, rotor 104a of motor 104 is fixed to substrate 111 by threadedly engaging screws with screw holes 223 formed in substrate 111. The shape of blades 230 is substantially equal to the shape of blades 221 explained in the second exemplary embodiment and hence, the repeated description of the shape of blades is omitted.

Also in the third exemplary embodiment, in the same manner as the first and second exemplary embodiments, blades 230 are integrally rotated with substrate 111. Accordingly, when substrate 111 is rotatably driven by motor 104, the plurality of blades 230 are also rotated in the same manner and an air flow is generated by the plurality of blades 230.

Accordingly, also in this exemplary embodiment, with an air flow generated by rotating the plurality of blades 230 together with the substrate 111, it is possible to effectively cool phosphor 102, substrate 111 and the like whose temperatures are elevated by being heated by excitation light.

In this exemplary embodiment, the plurality of blades 230 are integrally formed with substrate 111 and hence, it is unnecessary to provide a fan member in addition to the substrate.

Further, the plurality of blades 230 are integrally formed with substrate 111 and hence, compared to the configuration where the fan member is mounted on the substrate, phosphor wheel device 130 configuration exhibits higher heat conductivity from substrate 111 to blades 230. Accordingly, in substrate 111, blades 230 per se function as a heat radiator. Therefore, in this exemplary embodiment, phosphor wheel device 130 can be cooled more effectively.

A method for manufacturing substrate 111 is no way limited to die casting and substrate 111 may be formed by cold forging.

In the third exemplary embodiment, substrate 111 has the first structure shown in FIG. 4 in the first exemplary embodiment. However, substrate 111 may have the second structure shown in FIG. 5 or the third structure shown in FIG. 6.

[3.2 Effects and Others]

As described above, in this exemplary embodiment, the phosphor wheel device includes: the phosphor wheel; the motor; and the plurality of blades. The phosphor wheel has: the disc-shaped substrate; and the phosphor disposed on one surface of the substrate in a circumferential direction. The motor rotatably drives the phosphor wheel. The plurality of blades are fixed to the other surface of the substrate so as to be integrally rotated with the phosphor wheel, and extend in a radial direction of the phosphor wheel from the axis of rotation of the motor.

In the phosphor wheel device, it is desirable that the blades are disposed on the other surface of the substrate such that the blades are positioned more inside than a position of the phosphor. It is also desirable that a distance from the blades to the phosphor is set equal to or larger than a height of the blades.

In this phosphor wheel device, the plurality of blades and the substrate may be integrally formed with each other.

Also according to this exemplary embodiment, it is possible to effectively cool the phosphor, the substrate and the like, whose temperatures are elevated by being heated by the excitation light, by an air flow generated due to the rotation of the plurality of blades together with the substrate.

Phosphor wheel device 130 is one example of the phosphor wheel device. Substrate 111 is one example of the substrate. Blades 230 integrally formed on substrate 111 by die casting using aluminum as a material is one example of the blades.

(Fourth Exemplary Embodiment)

Hereinafter, phosphor wheel device accommodating housing 500 according to the fourth exemplary embodiment is described with reference to FIG. 12.

[4-1. Configuration]

Figure 12:
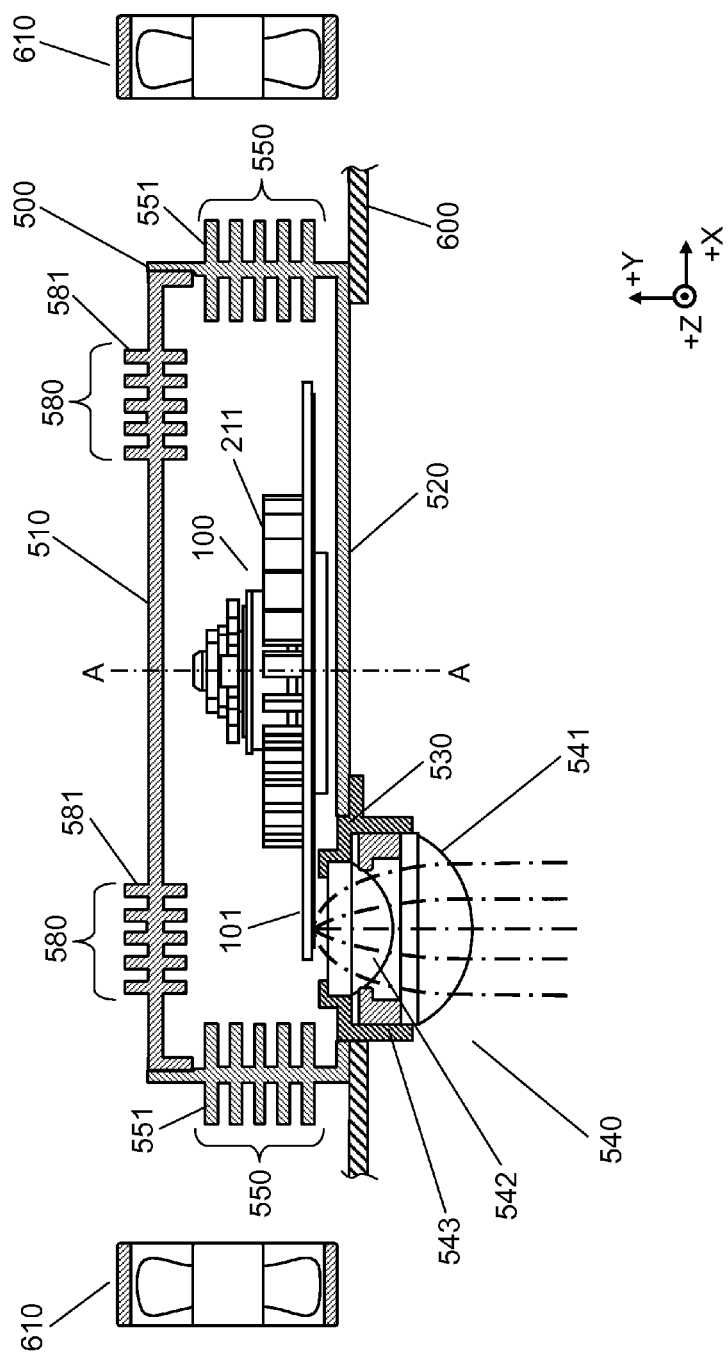
FIG. 12 is a cross-sectional view of a phosphor wheel device accommodating housing according to a fourth exemplary embodiment.

FIG. 12 is a cross-sectional view of phosphor wheel device accommodating housing 500 according to the fourth exemplary embodiment. In this exemplary embodiment, as shown in FIG. 12, for the sake of convenience, the description is made using an XYZ orthogonal coordinate set in the same manner as FIG. 4.

In this exemplary embodiment, a configuration example where phosphor wheel device 100 described in the first exemplary embodiment is accommodated in accommodating housing 500 is described. However, the phosphor wheel device to be accommodated in accommodating housing 500 may be phosphor wheel device 120 described in the second exemplary embodiment or may be phosphor wheel device 130 described in the third exemplary embodiment.

Although phosphor wheel device 100 to be accommodated in accommodating housing 500 has the first structure shown in FIG. 4 in the first exemplary embodiment, phosphor wheel device 100a having the second structure shown in FIG. 5 may be accommodated in accommodating housing 500.

In the fourth exemplary embodiment, components equal to the components of the first to third exemplary embodiments are given the same symbols and the repeated description of these components is omitted.

In the case where phosphor 102 formed on phosphor wheel device 100 is excited by excitation light such as laser beam thus emitting light, and the emitted light is used as a light source of an illumination device, when dust or the like adheres to a surface of phosphor 102, the dust is baked to phosphor 102 thus giving rise to a possibility that light emission brightness of phosphor 102 is lowered. Accordingly, it is desirable that phosphor wheel device 100 be hermetically sealed in accommodating housing 500.

Accommodating housing 500 includes lid body 510 and container body 520. Lid body 510 and container body 520 are formed of a material having excellent heat conductivity such as aluminum, for example. That is, accommodating housing 500 is formed of a material having excellent heat conductivity.

Container body 520 is configured such that phosphor wheel device 100 is accommodated in container body 520 and lid body 510 is mounted on container body 520. In a state where lid body 510 is mounted on container body 520, accommodating housing 500 exhibits a flat rectangular parallelepiped shape. First window 530 which allows incidence of excitation light to enter therein and irradiation of light emitted from phosphor 102 to outgo therefrom is formed in container body 520 at a position which faces phosphor 102 of phosphor wheel device 100 accommodated in accommodating housing 500. First window 530 is formed into a shape such that first lens unit 540 can be fitted in first window 530. Accommodating housing 500 is mounted on cabinet 600 of a projection-type image display device, for example.

By fitting first lens unit 540 in first window 530, the inside of container body 520 on which lid body 510 is mounted is brought into a hermetically sealed state. That is, accommodating housing 500 is formed into a hermetically sealed housing and hence, the intrusion of dust into accommodating housing 500 from the outside can be prevented.

First lens unit 540 includes first lens 541 and second lens 542 held on lens holding frame 543. In cabinet 600, an optical system is set such that excitation light emitted from an excitation light source (not shown in the drawing) is applied in the +Y direction (from below to above in the drawing) as indicated by a chain line in FIG. 12.

It is necessary to set a spaced-apart distance between first lens unit 540 and phosphor 102 based on a focal length of first lens unit 540. Accordingly, when blades 211 are formed on the same plane as a plane on which phosphor 102 is disposed in the phosphor wheel device, the restriction in design occurs such as the limitation on a height of blades 211. However, in phosphor wheel device 100, blades 211 are formed on a surface opposite to the surface on which phosphor 102 is disposed and hence, no such restriction occurs whereby the flexibility on design is relatively high. The same goes for other phosphor wheel devices described in this disclosure.

Excitation light is converged to phosphor 102 formed on substrate 101 of phosphor wheel device 100 by first lens 541 and second lens 542. Then, converged excitation light is applied to phosphor 102 so as to excite phosphor 102. In this case, phosphor 102 formed on substrate 101 is heated by converged excitation light so that temperatures of phosphor 102 and substrate 101 are elevated. In general, the deterioration of phosphor 102 progresses when phosphor 102 becomes a high temperature and hence, light emission efficiency of phosphor 102 is lowered. Accordingly, it is desirable to cool phosphor 102 for suppressing the lowering of light emission efficiency.

Light emitted from phosphor 102 excited by excitation light is, as indicated by a chain line in FIG. 12, emitted in the −Y direction (from above to below in the drawing) through second lens 542 and first lens 541.

Heat sink structure 580 provided with a plurality of fins 581 is formed on an inner surface side and an outer surface side of lid body 510. Heat sink structure 580 is one example of a heat exchanging element. Further, heat sink structure 550 provided with a plurality of fins 551 is formed on an inner surface side and an outer surface side of a side wall of container body 520. Heat sink structure 550 is one example of heat exchanging element. In this manner, accommodating housing 500 includes heat sink structures 550, 580 which are examples of heat exchange element respectively.

Phosphor wheel device 100 is disposed in accommodating housing 500 such that substrate 101 is rotated about an A-A axis which forms an axis of rotation. When phosphor wheel 103 is rotatably driven by motor 104, the plurality of blades 211 are rotated together with the substrate 101, and an air flow is generated in accommodating housing 500 by the plurality of rotating blades 211.

Figure 13:
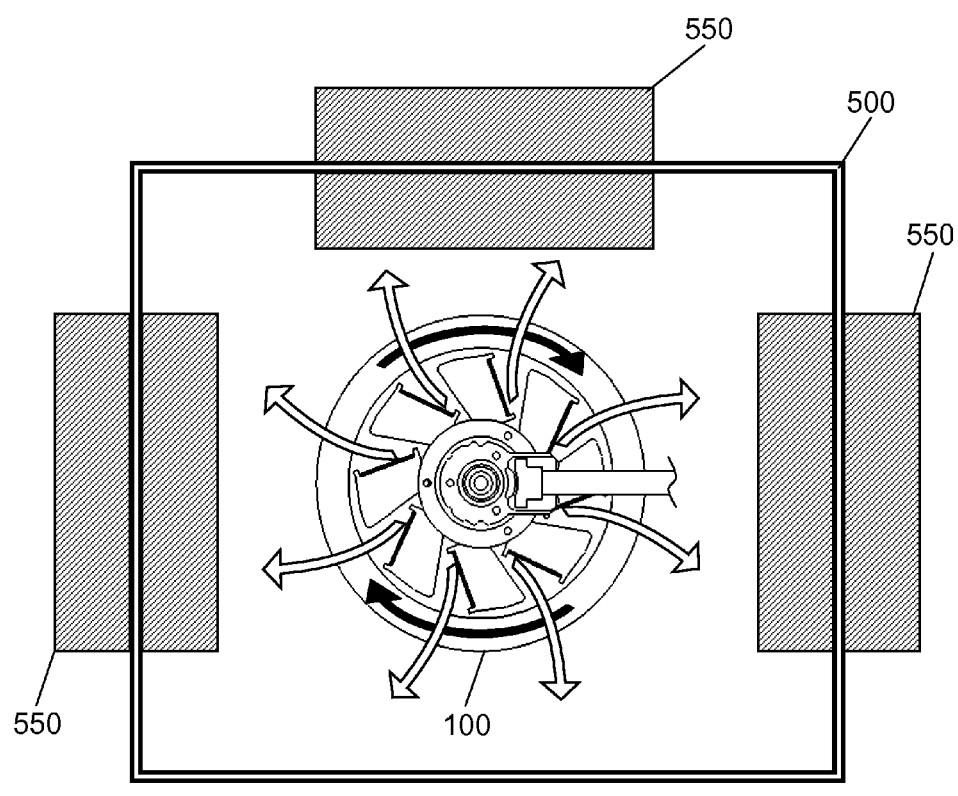
FIG. 13 is a view schematically showing an air flow generated in the phosphor wheel device accommodating housing according to the fourth exemplary embodiment.

FIG. 13 is a view schematically showing an air flow generated in phosphor wheel device accommodating housing 500 according to the fourth exemplary embodiment. In FIG. 13, the rotational direction of phosphor wheel 103 and the rough flow of an air flow are indicated by arrows. FIG. 13 is a plan view of phosphor wheel device 100 as viewed from a back surface side.

As shown in FIG. 13, an air flow generated due to the rotation of the plurality of blades 211 flows toward heat sink structures 550, and flows along surfaces of the plurality of fins 551 which form heat sink structures 550. Heat sink structures 550 are disposed at positions which allow the air flow to flow as described above. Although not shown in the drawing, the same goes for heat sink structures 580. With such a configuration, heat of air heated by phosphor wheel 103 is transferred to heat sink structures 550, 580 so that heat sink structures 550, 580 are heated. As described above, heat sink structures 550, 580 are formed of a material having excellent heat conductivity such as aluminum, for example, and hence, a heat exchange is constantly performed between heat sink structures 550, 580 and outside air through fins 551, 581. Accordingly, heat sink structures 550, 580 are cooled, and air which passes along fins 551, 581 is cooled. Air cooled in this manner returns to phosphor wheel 103 again, and phosphor wheel 103 is cooled by returned air.

As shown in FIG. 12, cooling fan 610 may be provided in a vicinity of side surfaces of accommodating housing 500 respectively. By cooling heat sink structures 550, 580 using supply air generated by cooling fans 610 as cooling air, air in accommodating housing 500 can be cooled more efficiently.

In this manner, in accommodating housing 500, air heated by heat generated when excitation light is applied to phosphor 102 forms an air flow by blades 211 of fan member 210, and the air flow flows along surfaces of heat sink structures 550, 580. Accordingly, heat in accommodating housing 500 is radiated to the outside through heat sink structures 550, 580.

In this exemplary embodiment, heat sink structures 580 are integrally formed with lid body 510, and heat sink structures 550 are integrally formed with container body 520. Accordingly, it is unnecessary to provide the heat sink as a body separately from accommodating housing 500.

FIG. 12 shows the configuration example where heat sink structures 580 are mounted on lid body 510. However, the accommodating housing may be formed without providing the heat sink structures to the lid body.

Figure 14:
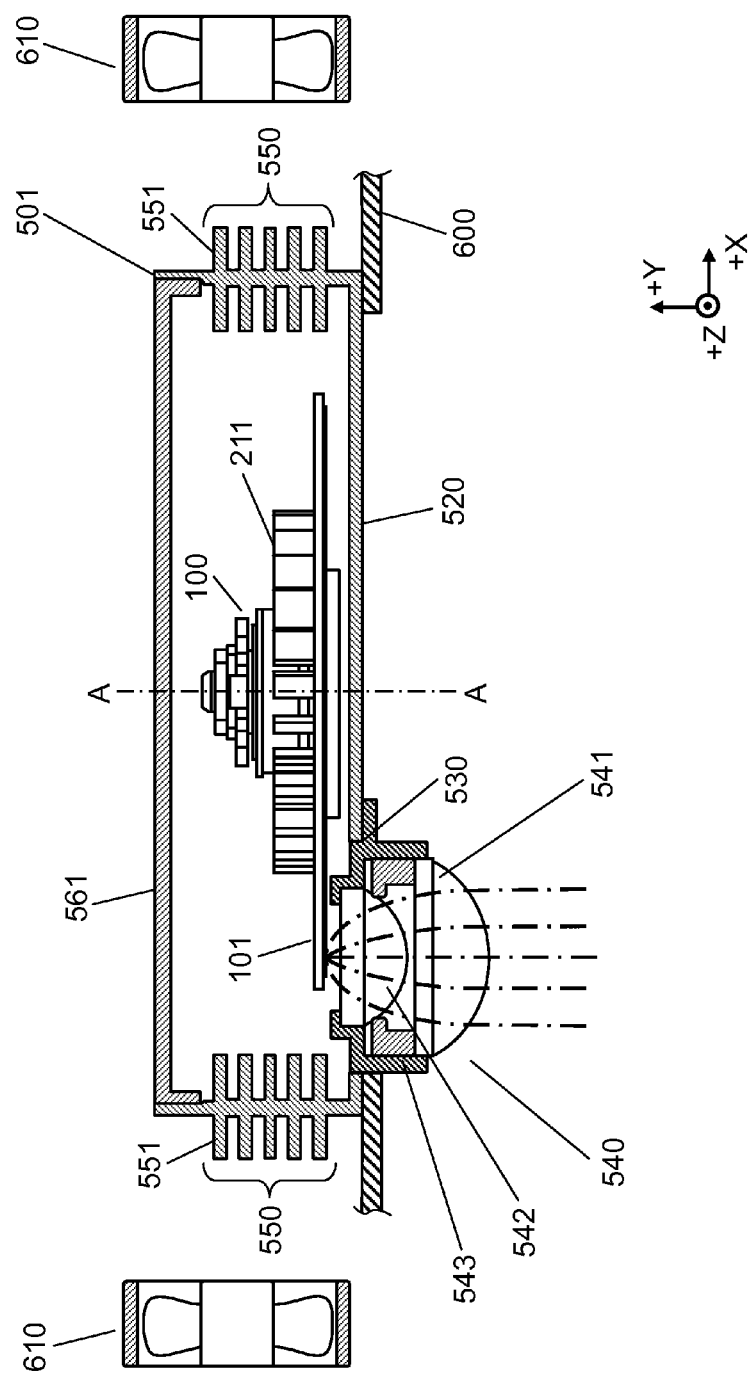
FIG. 14 is a cross-sectional view showing another example of the phosphor wheel device accommodating housing according to the fourth exemplary embodiment.

FIG. 14 is a cross-sectional view showing another example of phosphor wheel device accommodating housing 501 according to the fourth exemplary embodiment.

Accommodating housing 501 includes: lid body 561; and container body 520 shown in FIG. 12.

Different from lid body 510 shown in FIG. 12, lid body 561 shown in FIG. 14 does not have the heat sink structure. Since accommodating housing 501 shown in FIG. 14 is substantially equal to accommodating housing 500 shown in FIG. 12 except for the above-mentioned point, the repeated description of accommodating housing 501 is omitted.

In this manner, accommodating housing 501 may be configured such that the heat sink structures are not formed on lid body 561, and heat sink structures 550 are formed only on container body 520. This configuration facilitates the formation of lid body 561.

[4-2. Effects and Others]

As described above, in this exemplary embodiment, the phosphor wheel device accommodating housing has the heat exchange element, and hermetically accommodates the phosphor wheel device therein. The phosphor wheel device includes: the phosphor wheel; the motor; and the plurality of blades. The phosphor wheel has: the disc-shaped substrate; and the phosphor disposed on one surface of the substrate in a circumferential direction. The motor rotatably drives the phosphor wheel. The plurality of blades are fixed to the other surface of the substrate so as to be integrally rotated with the phosphor wheel, and extend in a radial direction of the phosphor wheel from the axis of rotation of the motor.

In the phosphor wheel device, it is desirable that the blades are disposed on the other surface of the substrate such that the blades are positioned more inside than a position of the phosphor. It is also desirable that a distance from the blades to the phosphor is set equal to or larger than a height of the blades.

The phosphor wheel device accommodating housing may include a first window which allows incidence of excitation light to enter therein and irradiation of light emitted from the phosphor to outgo therefrom. The phosphor wheel device is hermetically accommodated in the phosphor wheel device accommodating housing by fitting the first lens unit into the first window.

In this exemplary embodiment, it is possible to effectively cool the phosphor, the substrate and the like, whose temperatures are elevated by being heated by the excitation light, by an air flow generated due to the rotation of the plurality of blades together with the substrate.

Heat in the accommodating housing can be radiated to the outside through the heat exchange element.

Accommodating housings 500, 501 are examples of the phosphor wheel device accommodating housing respectively. Each of phosphor wheel devices 100, 100*a*, 120, 130 is one example of the phosphor wheel device hermetically accommodated in the phosphor wheel device accommodating housing. Each of heat sink structures 550, 580 is one example of the heat exchange element. First window 530 is one example of the first window. First lens unit 540 is one example of the first lens unit. Phosphor wheel 103 is one example of the phosphor wheel. Motor 104 is one example of the motor. Substrate 101 is one example of the substrate. Each of blades 211 is one example of the blades. Phosphor 102 is one example of the phosphor.

(Fifth Exemplary Embodiment)

Hereinafter, phosphor wheel device accommodating housing 502 according to a fifth exemplary embodiment is described with reference to FIG. 15.

[5-1. Configuration]

Figure 15:
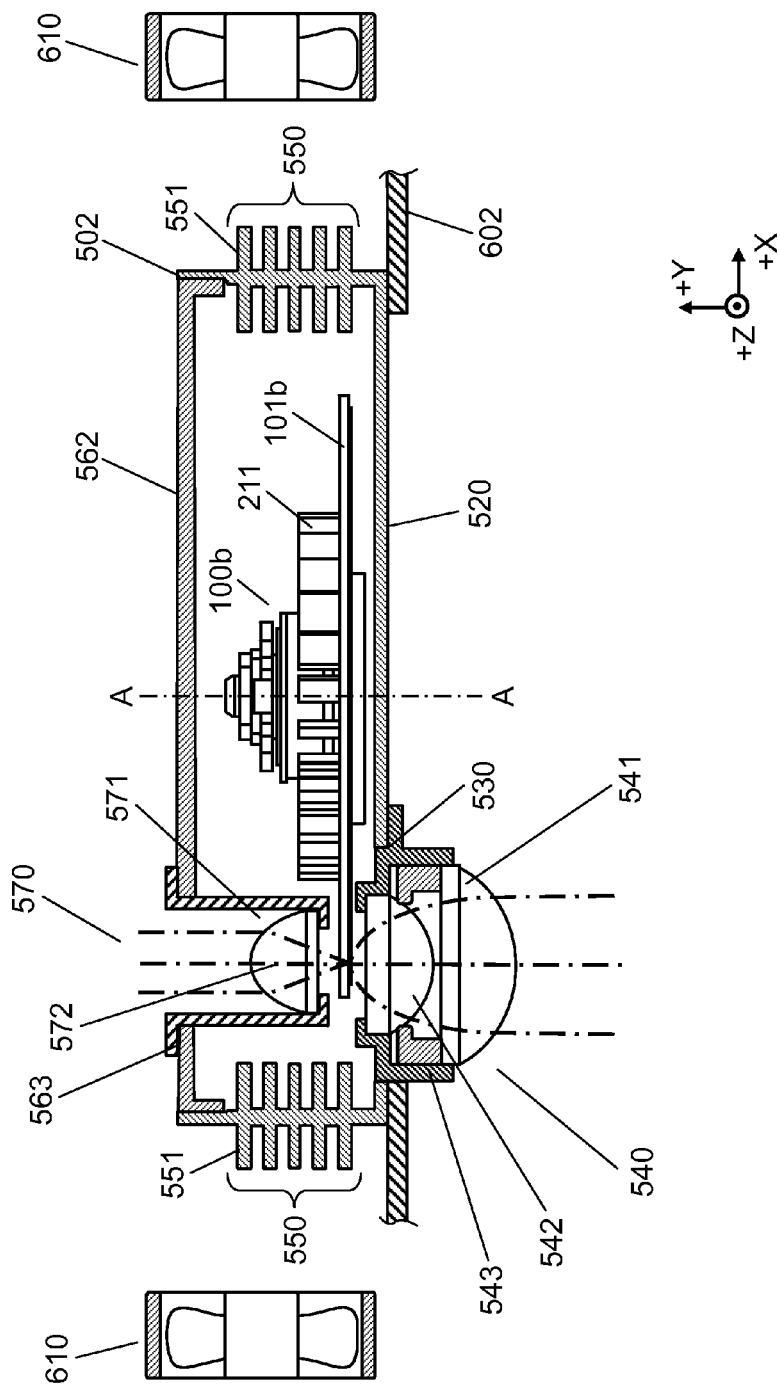
FIG. 15 is a cross-sectional view of a phosphor wheel device accommodating housing according to a fifth exemplary embodiment.

FIG. 15 is a cross-sectional view of phosphor wheel device accommodating housing 502 according to the fifth exemplary embodiment. In this exemplary embodiment, as shown in FIG. 15, for the sake of convenience, the description is made using an XYZ orthogonal coordinate system set in the same manner as FIG. 6.

In this exemplary embodiment, a configuration example where phosphor wheel device 100*b* which has the third structure shown in FIG. 6 in the first exemplary embodiment is accommodated in accommodating housing 502 having a flat rectangular parallelepiped shape is described. The phosphor wheel device to be accommodated in accommodating housing 502 may be phosphor wheel device 120 described in the second exemplary embodiment or may be phosphor wheel device 130 described in the third exemplary embodiment. It is assumed that such phosphor wheel device has the third structure shown in FIG. 6.

In the fifth exemplary embodiment, components equal to the components of the first to fourth exemplary embodiments are given the same symbols and the repeated description of these components is omitted.

Accommodating housing 502 includes: lid body 562 having the structure different from lid body 510 described in the fourth exemplary embodiment; and container body 520 having substantially the same structure as container body 520 described in the fourth exemplary embodiment. Lid body 562 and container body 520 are formed of a material having excellent heat conductivity such as aluminum, for example. That is, accommodating housing 502 is formed of a material having excellent heat conductivity. The repeated description of container body 520 is omitted.

A mechanism for cooling substrate 101*b* in accommodating housing 502 is substantially equal to the mechanism for cooling substrate 101 in accommodating housing 500, 501 described in fourth exemplary embodiment and hence, the repeated description of the mechanism is omitted.

Second window 563 which allows incidence of excitation light to enter therein is formed on lid body 562 on a back surface side of phosphor 102 of phosphor wheel device 100*b* accommodated in accommodating housing 502. Second window 563 is formed into a shape such that second lens unit 570 can be fitted in second window 563. Since first lens unit 540 is fitted in first window 530 of container body 520 and second lens unit 570 is fitted in second window 563 of lid body 562, accommodating housing 502 assumes a state where the inside of accommodating housing 502 is hermetically sealed. That is, accommodating housing 502 is formed into a hermetically sealed housing thus preventing the intrusion of dust from the outside. Accommodating housing 502 can be mounted on cabinet 602 of equipment, for example.

Second lens unit 570 is configured by mounting third lens 572 for converging incident excitation light on light incident member 571.

In cabinet 602, an optical system is set such that excitation light emitted from an excitation light source is applied in the −Y direction (from above to below in the drawing) as indicated by a chain line in FIG. 15.

The excitation light is converged to phosphor 102 formed on substrate 101*b* of phosphor wheel device 100*b* by third lens 572. In this case, the excitation light is applied to phosphor 102 through substrate 101*b* and dichroic film 400 from the back surface side of substrate 101*b* as shown in FIG. 6 so as to excite phosphor 102. Phosphor 102 formed on substrate 101*b* is heated by the converged excitation light so that a temperature of substrate 101*b* is elevated. It is desirable to cool heated phosphor 102 as described above.

Mixed light (white light W) formed of light emitted from phosphor 102 excited by excitation light and excitation light which passes through phosphor 102 without being used for excitation is, as indicated by a chain line in FIG. 15, emitted in the −Y direction (from above to below in the drawing) through second lens 542 and first lens 541.

Also in accommodating housing 502 having such a configuration, in the same manner as accommodating housings 500, 501 described in the fourth exemplary embodiment, air heated by heat generated when excitation light is applied to phosphor 102 forms an air flow by blades 211 of fan member 210, and the air flow flows along a surface of heat sink structure 550. Accordingly, heat in accommodating housing 502 is radiated to the outside through heat sink structure 550.

[5-2. Effects and Others]

As described above, in this exemplary embodiment, the phosphor wheel device accommodating housing has the heat exchange element, and hermetically accommodates the phosphor wheel device therein. The phosphor wheel device includes: the phosphor wheel; the motor; and the plurality of blades. The phosphor wheel has: the disc-shaped substrate; and the phosphor disposed on one surface of the substrate in a circumferential direction. The motor rotatably drives the phosphor wheel. The plurality of blades are fixed to the other surface of the substrate so as to be integrally rotated with the phosphor wheel, and extend in a radial direction of the phosphor wheel from the axis of rotation of the motor.

In the phosphor wheel device, it is desirable that the blades are disposed on the other surface of the substrate such that the blades are positioned more inside than a position of the phosphor. It is also desirable that a distance from the blades to the phosphor is set equal to or larger than a height of the blades.

The phosphor wheel device accommodating housing may include a first window which allows irradiation of light emitted from the phosphor to outgo therefrom and a second window which allows incidence of excitation light to enter therein. The phosphor wheel device is hermetically accommodated in the phosphor wheel device accommodating housing by fitting the first lens unit into the first window and by fitting the second lens unit into the second window.

Also in this exemplary embodiment, it is possible to effectively cool the phosphor, the substrate and the like, whose temperatures are elevated by being heated by the excitation light, by an air flow generated due to the rotation of the plurality of blades together with the substrate.

Heat in the accommodating housing can be radiated to the outside through the heat exchange element.

Accommodating housing 502 is one example of the phosphor wheel device accommodating housing. Each of phosphor wheel devices 100*b*, 120, 130 is one example of the phosphor wheel device hermetically accommodated in the phosphor wheel device accommodating housing. Heat sink structure 550 is one example of the heat exchange element. First window 530 is one example of the first window. Second window 563 is one example of the second window. First lens unit 540 is one example of the first lens unit. Second lens unit 570 is one example of the second lens unit. Substrate 101*b* is one example of the substrate. Blade 211 is one example of the blade. Phosphor 102 is one example of the phosphor.

(Sixth Exemplary Embodiment)

Hereinafter, a projection-type image display device (hereinafter also referred to as "projector") according to a sixth exemplary embodiment is described with reference to FIG. 16.

[6-1. Configuration]

Figure 16:
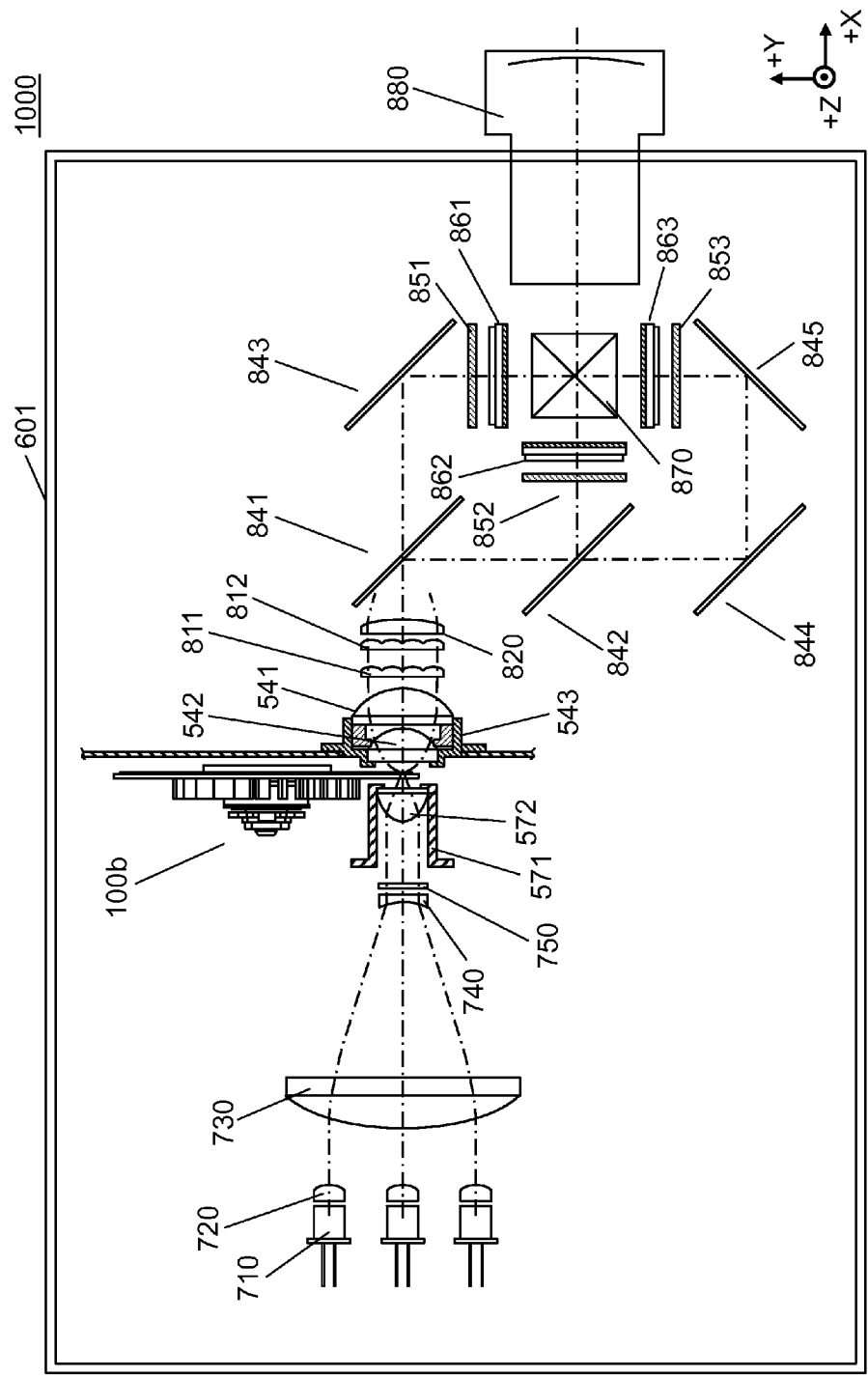
FIG. 16 is a view schematically showing one configuration example of a projection-type image display device according to a sixth exemplary embodiment.

FIG. 16 is a view schematically showing one configuration example of a projection-type image display device (projector 1000) according to the sixth exemplary embodiment. Projector 1000 shown in FIG. 16 is a liquid crystal projector where a liquid crystal panel is used as an optical modulation element.

Optical modulation elements are elements for generating image light by modulating red light R, green light G and blue light B based on image signals.

In this exemplary embodiment, a configuration example where projector 1000 includes phosphor wheel device 100*b* which has the third structure shown in FIG. 6 in the first exemplary embodiment is described. In this exemplary embodiment, a configuration example where the above-mentioned accommodating housing is not used and phosphor wheel device 100*b* is directly mounted on projector 1000 is described. The phosphor wheel device which projector 1000 includes may be phosphor wheel device 120 described in the second exemplary embodiment or may be phosphor wheel device 130 described in the third exemplary embodiment. It is assumed that the phosphor wheel device has the third structure shown in FIG. 6.

In this exemplary embodiment, as shown in FIG. 16, for the sake of convenience, the description is made using an XYZ orthogonal coordinate system. In FIG. 16, the direction perpendicular to substrate 101*b* of phosphor wheel device 100*b* (advancing direction of excitation light) is set as the +X direction, the radial direction of substrate 101*b* is set as the +Y direction, and the radial direction of substrate 101*b* which is orthogonal to the Y axis is set as the +Z direction.

In the sixth exemplary embodiment, components equal to the components of the first to fifth exemplary embodiments are given the same symbols and the repeated description of these components is omitted.

Projector 1000 includes: cabinet 601; blue laser diodes 710; collimate lenses 720; lenses 730, 740, 820; diffuser 750; light incident member 571; phosphor wheel device 100*b*; lens holding frame 543; first lens 541; second lens 542; third lens 572; integrator lenses 811, 812; first dichroic mirror 841; second dichroic mirror 842; first mirror 843; second mirror 844; third mirror 845; polarizers 851, 852, 853; blue liquid crystal panel device 861; green liquid crystal panel device 862; red liquid crystal panel device 863; prism 870; and a projection lens 880.

In projector 1000, the respective components are accommodated in cabinet 601 indicated by a duplicate line. Projector 1000 includes an intake fan (not shown in the drawing) for cooling heat generating parts in cabinet 601. Projector 1000 is configured such that outside air is taken into the inside of cabinet 601 by the intake fan and air which is heated and warmed by the heat generating parts is discharged to the outside of cabinet 601.

Projector 1000 is configured such that outside air is taken into the cabinet through a filter (not shown in the drawing) so as to prevent dust from being taken into projector 1000 at the time of supplying outside air into cabinet 601. Accordingly, in projector 1000, the intrusion of dust into the inside of projector 1000 from the outside is prevented by the filter.

Blue laser diode 710 which is one example of an excitation light source is configured to emit blue light B as excitation light in the +X direction (from a left side to a right side in the drawing). Blue light B emitted from blue laser diode 710 is collimated by collimate lens 720, and blue light B is converged by lens 730 and lens 740 which form an afocal system and, thereafter, blue light B is incident on diffuser 750.

Blue light B incident on diffuser 750 is diffused by diffuser 750, and is incident on third lens 572 disposed in light incident member 571. Blue light B which passes through third lens 572 is converged to phosphor 102 formed on substrate 101b of phosphor wheel device 100b. In this case, as shown in FIG. 6, blue light B (excitation light) passes through substrate 101b and dichroic film 400 from a back surface side of substrate 101b, and is applied to phosphor 102 so as to excite phosphor 102. Phosphor 102 formed on substrate 101b is heated by the converged excitation light so that a temperature of substrate 101b is elevated. It is desirable that heated phosphor 102 be cooled as described previously.

Mixed light (white light W) formed of light (yellow light Ye) emitted from phosphor 102 excited by excitation light and excitation light (blue light B) which passes through phosphor 102 without being used for excitation passes through second lens 542 and first lens 541 held on lens holding frame 543 and is emitted in the +X direction (from a left side to a right side in the drawing) as indicated by a chain line in FIG. 16.

White light W emitted from first lens 541 is made uniform after passing through a pair of integrator lenses 811, 812, passes through lens 820, and is incident on first dichroic mirror 841. First dichroic mirror 841 has a characteristic of allowing blue light B to pass therethrough and reflecting light of other colors (green light G, red light R). Accordingly, out of white light W emitted from first lens 541, blue light B passes through first dichroic mirror 841, and light of other colors is reflected on first dichroic mirror 841. Blue light B which passes through first dichroic mirror 841 is reflected on first mirror 843, and is incident on blue liquid crystal panel device 861 after passing through polarizer 851.

Light reflected on first dichroic mirror 841 (green light G, red light R) is incident on second dichroic mirror 842. Second dichroic mirror 842 has a characteristic of reflecting green light G and allowing red light R to pass therethrough. Accordingly, out of light reflected on first dichroic mirror 841, green light G is reflected on second dichroic mirror 842, and red light R passes through second dichroic mirror 842. Green light G reflected on second dichroic mirror 842 passes through polarizer 852 and is incident on green liquid crystal panel device 862.

Red light R which passes through second dichroic mirror 842 is reflected on second mirror 844 and third mirror 845, passes through polarizer 853 and is incident on red liquid crystal panel device 863.

Blue light B incident on blue liquid crystal panel device 861 is modulated based on a blue image signal thus forming blue image light. Green light G incident on green liquid crystal panel device 862 is modulated based on a green image signal thus forming green image light. Red light R incident on red liquid crystal panel device 863 is modulated based on a red image signal thus forming red image light. Blue image light, green image light and red image light are synthesized by prism 870, and synthesized light is incident on projection lens 880. Projection lens 880 projects image light synthesized by prism 870 on a screen (not shown in the drawing) in an enlarged manner.

In projector 1000 having such a configuration, when the plurality of blades 211 are rotated together with substrate 101b, an air flow is generated in projector 1000 by the plurality of rotating blades 211. Accordingly, air which is heated by heat generated at the time of applying excitation light to phosphor 102 is cooled by outside air taken into the inside of projector 1000 by the intake fan (not shown in the drawing) which projector 1000 includes. Accordingly, in projector 1000, phosphor 102, substrate 101b and the like heated by excitation light can be efficiently cooled.

FIG. 16 shows the configuration example where phosphor wheel device 100b is directly installed in projector 1000 without using the accommodating housing. However, to enhance an effect of preventing dust from adhering to phosphor wheel device 100b, it is desirable that phosphor wheel device 100b is installed in the projector in a state where phosphor wheel device 100b is accommodated in the accommodating housing.

Figure 17:
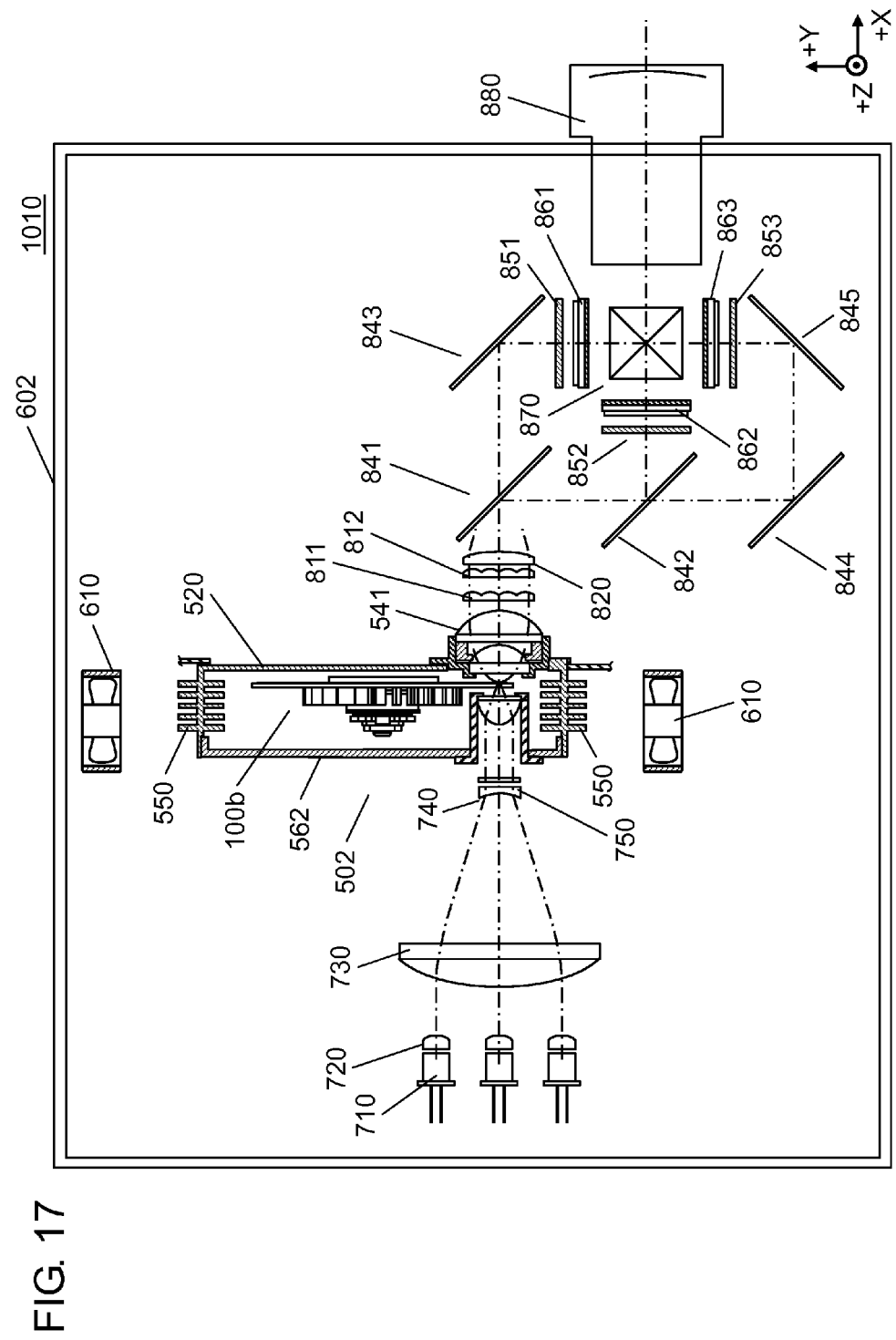
FIG. 17 is a view schematically showing another configuration example of the projection-type image display device according to the sixth exemplary embodiment.

FIG. 17 is a view schematically showing another configuration example of the projection-type image display device (projector 1010) according to the sixth exemplary embodiment. In the same manner as projector 1000 shown in FIG. 16, projector 1010 shown in FIG. 17 is a liquid crystal projector where a liquid crystal panel is used as the optical modulation element.

In projector 1010, unlike projector 1000 shown in FIG. 16, phosphor wheel device 100b is installed in cabinet 602 in a state where phosphor wheel device 100b is accommodated in accommodating housing 502 shown in FIG. 14 in the fifth exemplary embodiment. Further, cooling fan 610 for cooling accommodating housing 502 is disposed at a position where cooling fan 610 can supply air to heat sink structure 550 of accommodating housing 502.

Since projector 1010 shown in FIG. 17 is substantially equal to projector 1000 shown in FIG. 16 except for the above-mentioned points, the repeated description of the substantially equal parts is omitted.

In the configuration example shown in FIG. 17, phosphor wheel device 100b is accommodated in accommodating housing 502 and hence, it is possible to enhance an effect of preventing the adhesion of dust to phosphor 102. That is, it is possible to enhance an effect of preventing lowering of light emitted from phosphor 102 caused by adhesion of dust.

Also in projector 1010 having such a configuration, when the plurality of blades 211 are rotated together with the substrate 101b, an air flow is generated in accommodating housing 502 by the plurality of rotating blades 211. Accordingly, air which is heated by heat generated at the time of applying excitation light to phosphor 102 is efficiently cooled by means of heat sink structure 550 which accommodating housing 502 has. That is, in projector 1010, phosphor 102, substrate 101*b* and the like heated by excitation light can be efficiently cooled.

[6-2. Effects and Others]

As described above, in this exemplary embodiment, the projection-type image display device includes: the phosphor wheel device; the phosphor wheel device accommodating housing; the excitation light source generating excitation light which excites the phosphor; and the optical modulation element generating image light by modulating light emitted from the phosphor based on an image signal. The phosphor wheel device includes: the phosphor wheel; the motor; and the plurality of blades. The phosphor wheel has: the disc-shaped substrate; and the phosphor disposed on one surface of the substrate in a circumferential direction. The motor rotatably drives the phosphor wheel. The plurality of blades are fixed to the other surface of the substrate so as to be integrally rotated with the phosphor wheel, and extend in a radial direction of the phosphor wheel from the axis of rotation of the motor. The phosphor wheel device accommodating housing has the heat exchange element, and hermetically accommodates the phosphor wheel device therein.

In the phosphor wheel device, it is desirable that the blades are disposed on the other surface of the substrate such that the blades are positioned more inside than a position of the phosphor. It is also desirable that a distance from the blades to the phosphor is set equal to or larger than a height of the blades.

In this exemplary embodiment, it is possible to effectively cool the phosphor, the substrate and the like, whose temperatures are elevated by being heated by the excitation light, by an air flow generated due to the rotation of the plurality of blades together with the substrate.

Each of projectors 1000, 1010 is one example of the projection-type image display device. Each of blue liquid crystal panel device 861, green liquid crystal panel device 862 and red liquid crystal panel device 863 is one example of the optical modulation element. Blue laser diode 710 is one example of the excitation light source. Each of phosphor wheel devices 100*b*, 120, 130 is one example of the phosphor wheel device hermetically accommodated in the phosphor wheel device accommodating housing. Substrate 101*b* is one example of the substrate. Phosphor 102 is one example of the phosphor. Accommodating housing 502 is one example of the phosphor wheel device accommodating housing. Each of heat sink structures 550, 580 is one example of the heat exchange element respectively. Each of blades 211 is one example of the blades.

(Seventh Exemplary Embodiment)

Hereinafter, a projection-type image display device according to a seventh exemplary embodiment is described with reference to FIG. 18 and FIG. 19.

[7-1. Configuration]

Figure 18:
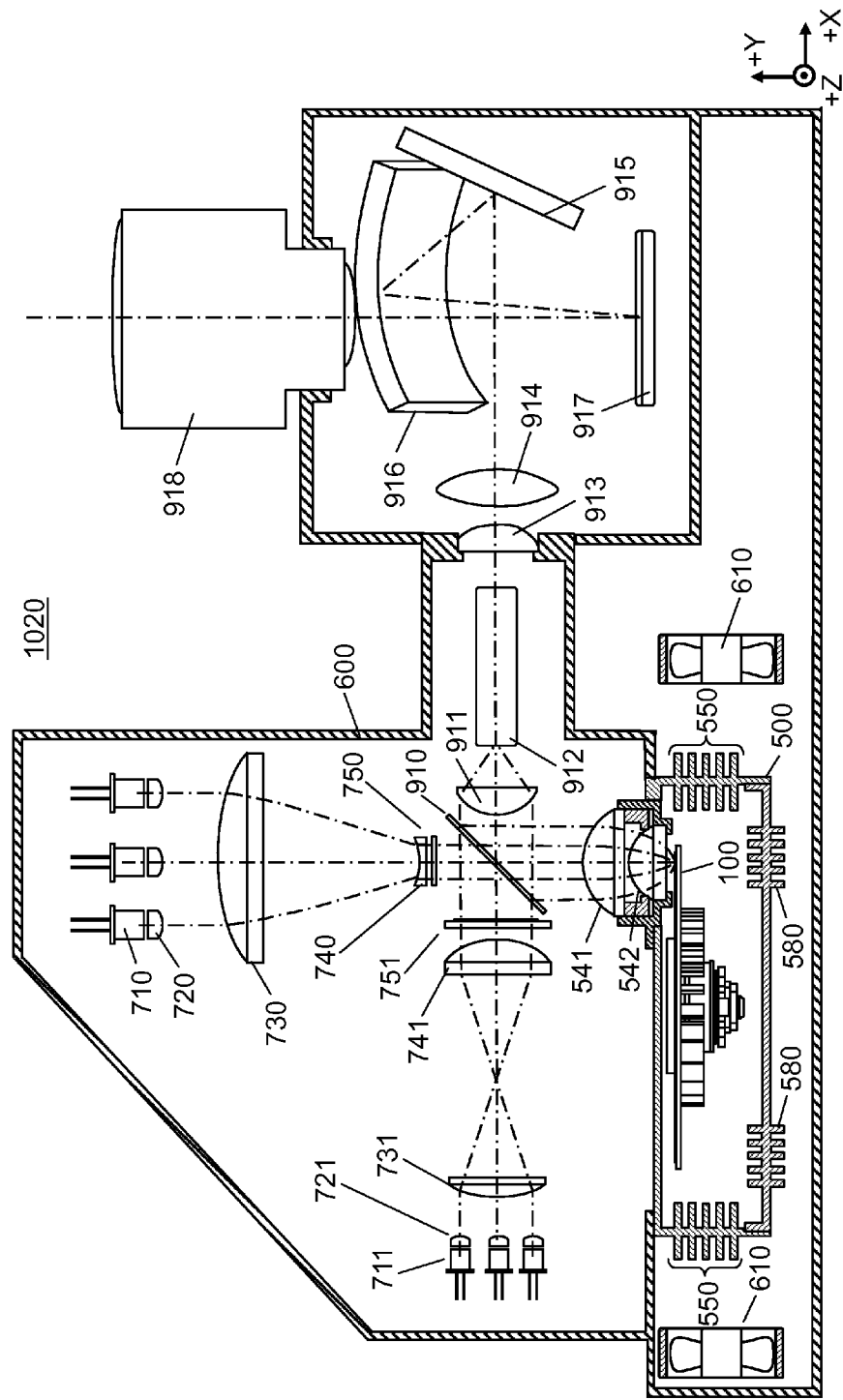
FIG. 18 is a view schematically showing one configuration example of a projection-type image display device according to a seventh exemplary embodiment.

FIG. 18 is a view schematically showing one configuration example of a projection-type image display device (projector 1020) according to the seventh exemplary embodiment. Projector 1020 shown in FIG. 18 is a DMD projector where a DMD (Digital Mirror Device) is used as the optical modulation element.

FIG. 19 is a plan view showing a surface of phosphor wheel device 100 which a projection-type image display device (projector 1020) according to the seventh exemplary embodiment includes, phosphor 102 being formed on the surface.

In this exemplary embodiment, a configuration example where, in projector 1020, phosphor wheel device 100 which has the first structure shown in FIG. 4 in the first exemplary embodiment is accommodated in accommodating housing 500 shown in FIG. 12 in the fourth exemplary embodiment, and accommodating housing 500 is disposed in cabinet 600 is described. The phosphor wheel device which projector 1020 includes may be phosphor wheel device 120 described in the second exemplary embodiment or may be phosphor wheel device 130 described in the third exemplary embodiment. Phosphor wheel device 100 accommodated in accommodating housing 500 has the first structure shown in FIG. 4 in the first exemplary embodiment. However, phosphor wheel device 100*a* having the second structure shown in FIG. 5 may be accommodated in accommodating housing 500. Alternatively, the accommodating housing which accommodates phosphor wheel device 100 therein may be accommodating housing 501 shown in FIG. 13.

In projector 1020, cooling fan 610 for cooling accommodating housing 500 is disposed at a position where cooling fan 610 can supply air to heat sink structures 550, 580 of accommodating housing 500.

In this exemplary embodiment, as shown in FIG. 18, for the sake of convenience, the description is made using an XYZ orthogonal coordinate system. In FIG. 18, the direction perpendicular to substrate 101 of phosphor wheel device 100 (direction opposite to advancing direction of excitation light) is set as the +Y direction, the radial direction of substrate 101 is set as the +X direction, and the radial direction of substrate 101 which is orthogonal to the X axis is set as the +Z direction.

In phosphor wheel device 100 accommodated in accommodating housing 500, as shown in FIG. 19, on substrate 101, red phosphor 102*a*, green phosphor 102*b* and non-phosphor forming portion 102*c* where phosphor 102 is not formed are sequentially formed along the circumferential direction with substantially a fixed width.

In the seventh exemplary embodiment, components equal to the components of the first to sixth exemplary embodiments are given the same symbols and the repeated description of these components is omitted.

Projector 1020 includes: cabinet 600; blue laser diodes 710, 711; collimate lenses 720, 721; lenses 730, 731, 740, 741, 913, 914; diffusers 750, 751; dichroic mirror 910; first lens 541; second lens 542; phosphor wheel device 100; cooling fan 610; accommodating housing 500; converging lens 911; rod integrator 912; mirrors 915, 916; DMD 917; and projection lens 918.

In projector 1020, the respective components are accommodated in cabinet 600. Projector 1020 includes an intake fan (not shown in the drawing) for cooling heat generating parts in cabinet 600. Projector 1020 is configured such that outside air is taken into the inside of cabinet 600 by the intake fan and air which is heated and warmed by the heat generating parts is discharged to the outside of cabinet 600.

Blue laser diode 710 which is one example of an excitation light source is configured to emit blue light B as excitation light in the −Y direction (from above to below in the drawing). Blue light B emitted from blue laser diode 710 is collimated by collimate lens 720, and is converged by lens 730 and lens 740 which form an afocal system and, thereafter, blue light B is incident on diffuser 750.

Blue light B incident on diffuser 750 is diffused by diffuser 750 and, thereafter, is incident on dichroic mirror 910.

Dichroic mirror 910 is disposed with an inclination of 45 degrees with respect to an optical axis. Dichroic mirror 910 has a characteristic of allowing blue light B to pass therethrough and reflecting light of other colors (red light R, green light G) thereon. Accordingly, blue light B which passes through diffuser 750 passes through dichroic mirror 910. Blue light B which passes through dichroic mirror 910 is converged on phosphor 102 formed on substrate 101 of phosphor wheel device 100 by first lens 541 and second lens 542, and is applied to phosphor 102.

Since substrate 101 of phosphor wheel device 100 is rotatably driven by motor 104, a region of phosphor wheel device 100 disposed at a light converging position of first lens 541 and second lens 542 (a region to which blue light B for excitation is applied) is sequentially changed in order of red phosphor 102a, green phosphor 102b and non-phosphor forming portion 102c. During a period in which blue light B for excitation is applied to red phosphor 102a, red phosphor 102a is excited so that red phosphor 102a emits red light R. During a period in which blue light B for excitation is applied to green phosphor 102b, green phosphor 102b is excited so that green phosphor 102b emits green light G. Red phosphor 102a and green phosphor 102b formed on substrate 101 are heated by this converged excitation light, and a temperature of substrate 101 is elevated. It is desirable that heated red phosphor 102a and heated green phosphor 102b be cooled as described previously.

During a period in which non phosphor forming portion 102c is positioned at the light converging position of first lens 541 and second lens 542, blue laser diode 710 is controlled to be turned off. Accordingly, blue light B for excitation is not applied to non-phosphor forming portion 102C.

Red light R emitted by red phosphor 102a and green light G emitted by green phosphor 102b are each emitted from substrate 101 in the −Y direction. Then, red light R and green light G emitted in the −Y direction pass through second lens 542 and first lens 541, are reflected on dichroic mirror 910 and are converged by converging lens 911. Then, converged light is incident on an incidence end of rod integrator 912.

In cabinet 600 of the projector, in addition to blue laser diode 710, blue laser diode 711 which is configured to emit blue light B in the +X direction (from a left side to a right side in the drawing) is disposed. Blue laser diode 711 is controlled such that blue laser diode 711 is turned on during a period in which blue laser diode 710 is turned off (that is, during a period in which non phosphor forming portion 102c is positioned at a light converging position of first lens 541 and second lens 542), and blue laser diode 711 is turned off during a period in which blue laser diode 710 is turned on.

Blue light B emitted from blue laser diode 711 is collimated by collimate lens 721 and, thereafter, blue light B is incident on lens 731. Blue light B which passes through lens 731 is made parallel by lens 741 and is incident on diffuser 751 so as to be diffused by diffuser 751. Blue light B which passes through diffuser 751 passes through dichroic mirror 910, is converged by converging lens 911 and, thereafter, is incident on an incidence end of rod integrator 912.

In this manner, red light R, green light G and blue light B are incident on the incident end of rod integrator 912 sequentially (that is, in accordance with time division). These red light R, blue light B and green light G propagate through rod integrator 912, and are sequentially emitted from an irradiation end of rod integrator 912.

Light emitted from rod integrator 912 passes through lens 913 and lens 914, is reflected on mirror 915 and mirror 916, and is incident on DMD 917. DMD 917 modulates red light R, green light G and blue light B based on image signals thus generating image light.

The image light generated by DMD 917 is emitted from DMD 917 in the +Y direction, and is incident on projection lens 918. Projection lens 918 projects the image light emitted from DMD 917 on a screen (not shown in the drawing) in an enlarged manner.

Also in projector 1020 having such a configuration, when the plurality of blades 211 are rotated together with substrate 101, an air flow is generated in accommodating housing 500 by the plurality of rotating blades 211. Accordingly, air which is heated by heat generated at the time of applying excitation light to phosphor 102 is efficiently cooled by means of heat sink structures 550, 580 which accommodating housing 500 has. That is, in projector 1020, phosphor 102, substrate 101 and the like heated by excitation light can be efficiently cooled.

[7-2. Effects and Others]

As described above, in this exemplary embodiment, the projection-type image display device includes: the phosphor wheel device; the phosphor wheel device accommodating housing; the excitation light source generating excitation light which excites the phosphor; and the optical modulation element generating image light by modulating light emitted from the phosphor based on an image signal. The phosphor wheel device includes: the phosphor wheel; the motor; and the plurality of blades. The phosphor wheel has: the disc-shaped substrate; and the phosphor disposed on one surface of the substrate in a circumferential direction. The motor rotatably drives the phosphor wheel. The plurality of blades are fixed to the other surface of the substrate so as to be integrally rotated with the phosphor wheel, and extend in a radial direction of the phosphor wheel from the axis of rotation of the motor. The phosphor wheel device accommodating housing has the heat exchange element, and hermetically accommodates the phosphor wheel device therein.

In the phosphor wheel device, it is desirable that the blades are disposed on the other surface of the substrate such that the blades are positioned more inside than a position of the phosphor. It is also desirable that a distance from the blades to the phosphor is set equal to or larger than a height of the blades.

Also in this exemplary embodiment, it is possible to effectively cool the phosphor, the substrate and the like, whose temperatures are elevated by being heated by the excitation light, by an air flow generated due to the rotation of the plurality of blades together with the substrate.

Projector 1020 is one example of the projection-type image display device. DMD 917 is one example of the optical modulation element. Blue laser diode 710 is one example of the excitation light source. Each of phosphor wheel devices 100, 120, 130 is one example of the phosphor wheel device hermetically accommodated in the phosphor wheel device accommodating housing. Motor 104 is one example of the motor. Substrate 101 is one example of the substrate. Each of phosphor 102, red phosphor 102a and green phosphor 102b is one example of the phosphor. Each of accommodating housings 500, 501 is one example of the phosphor wheel device accommodating housing. Each of heat sink structures 550, 580 is examples of the heat exchange element respectively. Each of blades 211 is one example of the blades.

(Other Exemplary Embodiments)

As has been described heretofore, the first to seventh exemplary embodiments have been described as examples of the technique disclosed by this application. However, the technique of this disclosure is not limited such examples and is applicable to embodiments where a change, replacement, addition, omission or the like is made. Further, new embodiments may be provided by combining respective components described in the above-mentioned first to seventh exemplary embodiments.

This disclosure is applicable to a phosphor wheel device used in a projection-type image display device, a phosphor wheel device accommodating housing which accommodates the phosphor wheel device in the inside thereof, and a projection-type image display device provided with the phosphor wheel device. To be more specific, this disclosure is applicable to a liquid crystal projector, a DMD projector and the like.

What is claimed is:

1. A phosphor wheel device comprising:
   a phosphor wheel having: a disc-shaped substrate and a phosphor disposed on one surface of the substrate in a circumferential direction;
   a motor which rotatably drives the phosphor wheel; and
   a fan member fixed to the other surface of the substrate so as to be integrally rotated with the phosphor wheel, having a plurality of blades extending in a radial direction of the phosphor wheel from an axis of rotation of the motor, and formed of a material different from a material that forms the substrate.

2. The phosphor wheel device according to claim 1, wherein the blades are disposed on the other surface of the substrate such that the blades are positioned more inside than a position of the phosphor.

3. The phosphor wheel device according to claim 2, wherein a distance from the blades to the phosphor is set to equal to or larger than a height of the blades.

4. The phosphor wheel device according to claim 1, wherein the fan member is formed by bending a stainless steel plate.

5. The phosphor wheel device according to claim 1, wherein at least a region, where the phosphor is disposed, of the one surface of the substrate has undergone a surface treatment such that the region reflects light emitted from the phosphor.

6. The phosphor wheel device according to claim 1, wherein the substrate is formed of a heat conductive material.

7. The phosphor wheel device according to claim 6, wherein the substrate is formed of an aluminum alloy.

8. The phosphor wheel device according to claim 6, wherein the substrate is formed of sapphire glass.

9. A phosphor wheel device accommodating housing comprising a heat exchange element and hermetically accommodating a phosphor wheel device therein, wherein the phosphor wheel device comprises:
   a phosphor wheel having: a disc-shaped substrate, and a phosphor disposed on one surface of the substrate in a circumferential direction;
   a motor which rotatably drives the phosphor wheel; and
   a fan member fixed to the other surface of the substrate so as to be integrally rotated with the phosphor wheel, having a plurality of blades extending in a radial direction of the phosphor wheel from an axis of rotation of the motor, and formed of a material different from a material that forms the substrate.

10. The phosphor wheel device accommodating housing according to claim 9, wherein the blades are disposed on the other surface of the substrate such that the blades are positioned more inside than a position of the phosphor.

11. The phosphor wheel device accommodating housing according to claim 10, wherein a distance from the blades to the phosphor is set equal to or larger than a height of the blades.

12. The phosphor wheel device accommodating housing according to claim 9 further comprising a first window which allows incidence of excitation light to enter therein and irradiation of light emitted from the phosphor to outgo therefrom, wherein the phosphor wheel device is hermetically accommodated by fitting a first lens unit into the first window.

13. The phosphor wheel device accommodating housing according to claim 9 further comprising:
    a first window which allows irradiation of light emitted from the phosphor to outgo therefrom; and
    a second window which allows incidence of excitation light to enter therein, wherein
    the phosphor wheel device is hermetically accommodated by fitting a first lens unit into the first window and by fitting a second lens unit into the second window.

14. A projection-type image display device comprising:
    a phosphor wheel device including:
       a phosphor wheel having a disc-shaped substrate and a phosphor disposed on one surface of a substrate in a circumferential direction;
       a motor which rotatably drives the phosphor wheel; and
       a fan member fixed to the other surface of the substrate so as to be integrally rotated with the phosphor wheel, having a plurality of blades extending in a radial direction of the phosphor wheel from an axis of rotation of the motor, and formed of a material different from a material that forms the substrate;
    a phosphor wheel device accommodating housing having a heat exchange element and hermetically accommodating the phosphor wheel device therein;
    an excitation light source generating excitation light which excites the phosphor; and
    an optical modulation element generating image light by modulating incident light based on an image signal.

15. The projection-type image display device according to claim 14, wherein the blades are disposed on the other surface of the substrate such that the blades are positioned more inside than a position of the phosphor.

16. The projection-type image display device according to claim 15, wherein a distance from the blades to the phosphor is set equal to or larger than a height of the blades.

17. The projection-type image display device according to claim 14, wherein the fan member is formed by bending a stainless steel plate.

* * * * *